(12) United States Patent
Alpmen et al.

(10) Patent No.: US 11,820,641 B2
(45) Date of Patent: Nov. 21, 2023

(54) SMART BEER TAP

(71) Applicant: Pubinno, Inc., San Francisco, CA (US)

(72) Inventors: Ahmet Necdet Alpmen, Istanbul (TR); Yusuf Can Algul, Istanbul (TR)

(73) Assignee: Pubinno, Inc., San Francisco, CA (US)

( * ) Notice: Subject to any disclaimer, the term of this patent is extended or adjusted under 35 U.S.C. 154(b) by 51 days.

(21) Appl. No.: 16/621,428

(22) PCT Filed: Jun. 18, 2018

(86) PCT No.: PCT/US2018/038091
§ 371 (c)(1),
(2) Date: Dec. 11, 2019

(87) PCT Pub. No.: WO2018/236758
PCT Pub. Date: Dec. 27, 2018

(65) Prior Publication Data
US 2021/0139309 A1 May 13, 2021

Related U.S. Application Data

(60) Provisional application No. 62/523,149, filed on Jun. 21, 2017.

(51) Int. Cl.
*B67D 1/14* (2006.01)
*B67D 1/08* (2006.01)
(Continued)

(52) U.S. Cl.
CPC ......... *B67D 1/1416* (2013.01); *B67D 1/0884* (2013.01); *B67D 1/0888* (2013.01);
(Continued)

(58) Field of Classification Search
CPC .. B67D 1/1422; B67D 1/1272; B67D 1/1243; B67D 1/1275; B67D 1/1416
See application file for complete search history.

(56) References Cited

U.S. PATENT DOCUMENTS 2,675,822 A * 4/1954 Redlin ................. B67D 1/1416
137/170.4
2,680,010 A * 6/1954 Dubay ................. B05B 7/0037
261/124

(Continued)

FOREIGN PATENT DOCUMENTS

GB 2415763 A 1/2006
GB 2434572 A * 8/2007 ........... B67D 1/1416

(Continued)

OTHER PUBLICATIONS

Real-time_Definition_Meaning _-_Merriam-Webster.pdf; obtained on Feb. 8, 2022 from: https://www.merriam-webster.com/dictionary/real-time.*

(Continued)

*Primary Examiner* — Vishal Pancholi
*Assistant Examiner* — Randall A Gruby
(74) *Attorney, Agent, or Firm* — Knobbe Martens Olson & Bear LLP

(57) ABSTRACT

Certain aspects relate to systems and techniques for smart draft beer taps that can dynamically vary flow rate and control the amount of dispensed head based on one or more of sensed parameters of the beer, the draft beer environment, characteristics of the beer, and on brewery specified pouring standards. The disclosed systems provide networked data communication relating to bar draft beer pouring conditions.

27 Claims, 14 Drawing Sheets

(51) Int. Cl.
*B67D 1/12* (2006.01)
*G06Q 10/087* (2023.01)
*G06Q 30/0601* (2023.01)

(52) U.S. Cl.
CPC ......... *B67D 1/1243* (2013.01); *G06Q 10/087* (2013.01); *G06Q 30/0631* (2013.01); *G06Q 30/0633* (2013.01); *B67D 2001/1483* (2013.01)

(56) References Cited

U.S. PATENT DOCUMENTS

| | | | | |
|---|---|---|---|---|
| 4,111,243 A * | 9/1978 | Fetterman | ............ | G01F 13/006 141/102 |
| 4,979,641 A * | 12/1990 | Turner | ................ | B67D 1/1234 222/25 |
| 5,022,557 A * | 6/1991 | Turner | ................ | B67D 1/1466 222/54 |
| 5,335,705 A * | 8/1994 | Morishita | ................ | B67D 1/04 222/61 |
| 5,431,302 A * | 7/1995 | Tulley | .................... | B67D 7/303 222/14 |
| 5,454,406 A * | 10/1995 | Rejret | ................ | B67D 1/1213 141/83 |
| 6,398,084 B2 * | 6/2002 | Maruyama | ........... | B67D 1/1279 141/192 |
| 7,753,231 B2 * | 7/2010 | Giles | .................... | G01F 15/003 222/14 |
| 8,383,184 B2 * | 2/2013 | Gugerli | ................ | A47J 31/401 426/594 |
| 8,584,900 B2 * | 11/2013 | Metropulos | .......... | B67D 1/0041 222/145.5 |
| 8,610,536 B2 * | 12/2013 | Libby | ................... | G07F 13/025 340/541 |
| 8,657,262 B2 * | 2/2014 | Burri | ................... | A47J 31/4485 99/323.1 |
| 8,833,405 B2 * | 9/2014 | Phallen | ................ | G05D 7/0652 141/94 |
| 8,880,427 B1 * | 11/2014 | Jones | ................... | G07F 13/065 16/21 |
| 9,745,187 B2 * | 8/2017 | McDonald | ........... | B67D 1/0412 |
| 9,895,667 B2 * | 2/2018 | McDonald | ............. | B01F 31/84 |
| D857,451 S * | 8/2019 | Alpmen | ........................ | D7/398 |
| 11,009,278 B2 * | 5/2021 | Scalf | ..................... | F25D 29/005 |
| 11,084,707 B2 * | 8/2021 | Wade | .................. | B67D 1/0888 |
| 11,131,398 B2 * | 9/2021 | Srikanth | ............. | F16K 31/1221 |
| 2008/0142115 A1 * | 6/2008 | Vogt | ....................... | B67D 1/124 141/374 |
| 2008/0251533 A1 * | 10/2008 | Giles | ..................... | B67D 1/1243 222/14 |
| 2009/0014075 A1 * | 1/2009 | Hansson | .................. | B67D 1/1466 137/600 |
| 2010/0084426 A1 * | 4/2010 | Devers | .................... | G07F 13/02 222/2 |
| 2010/0312645 A1 * | 12/2010 | Niejadlik | ................ | G06Q 30/06 455/414.1 |
| 2013/0314244 A1 * | 11/2013 | Hershberger | ........ | B67D 1/0888 340/870.02 |
| 2015/0129617 A1 * | 5/2015 | Peirsman | ............. | B67D 1/0004 222/394 |
| 2015/0317756 A1 * | 11/2015 | Agiv | ...................... | G06Q 30/02 705/7.35 |
| 2015/0329346 A1 * | 11/2015 | Miller | ................... | B67D 1/0884 222/23 |
| 2016/0207753 A1 * | 7/2016 | Choi | .................... | B67D 1/1238 |
| 2016/0297665 A1 * | 10/2016 | Petermann | .......... | B67D 1/1422 |
| 2016/0325243 A1 * | 11/2016 | McDonald | ............ | B67D 1/10 |
| 2017/0210610 A1 * | 7/2017 | Henson | ................ | B67D 1/0406 |
| 2022/0404184 A1 * | 12/2022 | Griffioen | ............... | G01F 23/266 |

FOREIGN PATENT DOCUMENTS

| | | | | |
|---|---|---|---|---|
| GB | 2434572 A | 8/2007 | | |
| GB | 2449698 | 12/2008 | | |
| GB | 2221209 | 11/2013 | | |
| WO | WO-9842612 A2 * | 10/1998 | .......... | B67C 3/2642 |
| WO | WO-2017105552 A1 * | 6/2017 | | |

OTHER PUBLICATIONS

Extended European Search Report dated Nov. 5, 2018 PCT/US2018/038091.

* cited by examiner

SMART BEER TAP

CROSS-REFERENCE TO RELATED APPLICATIONS

The present application claims priority to U.S. Provisional Application No. 62/523,149, entitled "SMART BEER TAP," filed Jun. 21, 2017, the content of which is hereby incorporated by reference in its entirety.

TECHNICAL FIELD

The systems and methods disclosed herein are directed to draft beer taps, and, more particularly, to a smart draft beer tap configured to optimize poured beer quality based on sensed parameters and predefined pouring instructions.

BACKGROUND

Draft or draught beer is beer served from a cask or keg rather than from a bottle or can. A beer tap is a valve, specifically a tap, for controlling the release of draft beer. Beer supplied in kegs is typically served with the aid of external pressure, for example from a pressurized container of a gas such as carbon dioxide or nitrogen, which forces the beer out of the keg and up a narrow tube (referred to as a beer line) that leads to the bar where the beer will be poured. The beer tap includes a valve at the end of this tube and can be built into a fixture on the bar such as a draft beer tower or provided as a portable tap. Opening the valve of the beer tap with a lever causes beer, pushed by the pressurized gas, to flow into a glass.

SUMMARY

Breweries strive to provide a high quality of the beer to their consumers. With bottled or canned beer, the quality of the beer as it is brewed at the brewery is delivered straight to the consumer. However, the end quality of draft beer is more difficult to control, as this is partially dependent upon the beer storage and draft beer system conditions of the bar as well as the pouring technique of individual bartenders. For example, beer quality can either be enhanced or reduced by variations in beer carbonation level, changes to the beer temperature, and different amounts of foam in a poured glass of beer.

Beer head is the frothy foam that rests on top of beer which is produced by bubbles of gas, typically carbon dioxide that was dissolved into the beer during the brewing process, rising to the surface. Among carbonated alcoholic beverages, beer is unique in that it can produce and maintain a stable head of foam under the right conditions. The density and longevity of the head can be influenced by the type of malt and other ingredients from which the beer was fermented. Certain compounds in the beer (for example, proteins derived from barley malt and acids derived from hops) improve stability of the foam by linking together to form a "skin" around gas bubbles that emerge from the liquid beer, while other compounds such as lipids can interfere with such skin, resulting in foam collapse. The right amount of head can act as an insulating layer to keep the temperature of the beer more stable and can further serve to retain the carbonation of the beer, and the aroma released by gas escaping from the head can enhance the flavor experienced by the consumer. However, too much head is undesirable because it detracts from the liquid volume of the drink. Accordingly, breweries may desire that a specific amount of head be poured with each glass of their beer in order to provide the consumer with a beer that satisfies the brewery's quality standards.

Accordingly, controlling the balance between liquid beer and head that is transferred from a beer keg to a glass is an important aspect of draft beer pouring. The amount of the beer head produced during pouring is variable and affected by flow rate of the beer through the tap, pour angle (e.g. amount of agitation/turbulence in the glass), pressure in the beer keg, temperature (e.g., of the beer within the beer keg, the beer line, the tap, and the ambient air), and ingredients of that particular beer. Many of these parameters are unknown to a bartender as they pour draft beer through a tap. For example, the kegs in which draft beer is stored can be temperature-controlled via cooling systems and refrigerated rooms. However, the draft beer in the beer line and the draft beer tower can vary from the specified temperature as it travels away from the cooled keg storage to the bar. Longer beer lines can lead to greater temperature differentials between the cooled keg storage and the beer tap spout. To illustrate the temperature sensitivity of beer foaming, beer should be kept around 38 degrees Fahrenheit in order to retain the level of carbonation that was created during the brewing process and to prevent unwanted foaming of the beer as it is coming out of the draft beer tap. When some beer reaches around 42 degrees Fahrenheit a significant amount of foam can form as the beer passes through the beer line, and at 52 degrees Fahrenheit it can be almost all foam.

With existing systems, the bartender pouring the draft beer is unable to ascertain the various foam-related beer parameters upon pouring, and as a result the draft beer system operates in suboptimal conditions much of the time. This results in irregular amounts of foam emerging from the tap, beers that are too foamy, beers that are not at the ideal temperature, beers that are over or under carbonated, beers that are not fresh, and beers poured through lines that require maintenance. With beers that are too foamy, bartenders often over-pour (e.g., cause a glass to overflow with beer) in order to reduce the amount of excess foam. In addition, existing systems that rely on manual bartender pouring via a tap often result in over-pouring, particularly during busy hours, resulting in wasted beer inventory. These issues detract from consumer experience and reduce profitability in draft beer.

The aforementioned problems, among others, are addressed in some embodiments by the smart beer taps described herein. The disclosed taps can dynamically vary the rate of beer flowing through the tap in order to achieve a predetermined amount of foam ("head") per poured glass based on sensed beer parameters including temperature (at one or more points in the draft beer system), pressure, and color, as well as known characteristics of the particular beer being poured (e.g., brand, beer type style, ingredients, etc.). The disclosed taps include a creamer mechanism (sometimes referred to herein as a "creamer") that can intentionally transform some of the beer poured into each glass into head of a desired amount and/or density. In some aspects, the head quantity per glass can be specified by the brewery of the beer. Accordingly, the disclosed taps can provide consumers with consistently poured beers based on foam control standards that provide a high-quality consumer experience. Further, the disclosed smart taps can base flow rate on sensed parameters in order to achieve a fast pour while minimizing unwanted foaming, thus achieving both high pouring efficiency and high poured beer quality.

Additionally, the smart taps can help reduce waste, mitigate fraud, provide valuable information that enables bars and breweries to efficiently plan orders and operations, and reduce bartender time for drink pouring. For example, the smart taps can communicate over a network with a central data repository that stores sensor data from a number of different smart taps. The data can be aggregated and analyzed to identify insights relating to pouring quality and system maintenance, as well as to provide recommendations to and for various beers, bars, and breweries as described herein.

Accordingly, one aspect relates to a fluid dispensing tap comprising a housing having a fluid path extending therethrough from an input aperture to an output aperture in a spout of the tap; a display positioned on an exterior surface of the housing; at least one sensor positioned along the fluid path and configured to generate parameter data representing a parameter of fluid flowing along the fluid path; a variable opening valve positioned along the fluid path and configured to be define a variable area across the fluid path; an actuator configured to open and close the variable opening valve; a creamer positioned along the fluid path and configured to agitate the fluid and to cause the fluid to transform from a liquid into a foam; and a controller configured to receive the parameter data from the at least one sensor; based at least partly on the parameter data, determine an extent to which to open or close the variable opening valve, wherein determining the extent is based on real-time sensing of the parameter data; control the actuator to open or close the variable opening valve to the determined extent; in response to receiving a creamer activation signal, activate the creamer to agitate the fluid; and generate an output for presentation on the display based at least partly on the parameter data.

In some embodiments, the variable opening valve comprises a pinch valve, and the creamer comprises an ultrasonic transducer. In some embodiments, the variable opening valve comprises a mechanical valve, and the creamer comprises an opening in the mechanical valve having a diameter of less than 1 mm.

Some embodiments further comprise a handle coupled to an exterior of the housing; and a position sensor configured to generate position data representing whether the handle is in at least two of first, second, or third positions (e.g., the handle may be configured to move between only two of the three disclosed positions in some embodiments or between all three of the disclosed positions in other embodiments); and the controller is configured to: in response to receiving position data indicating that the handle is in the first position, close the variable opening valve to stop flow of the fluid along the fluid path; in response to receiving position data indicating that the handle is in the second position, control the actuator to open or close the variable opening valve to the determined extent; and in response to receiving position data indicating that the handle is in the third position, activate the creamer.

In some embodiments, the controller is configured to output alerts or status indicators on the display in real time based on the parameter data. Some embodiments further comprise a network connectivity module configured to transmit the parameter data over a network In some embodiments, the fluid comprises beer, and the controller is configured to determine the extent to which to open or close the variable opening based at least partly on a type of the beer. In some embodiments, the at least one sensor comprises a pressure sensor, temperature sensor, and flow meter. In some embodiments, the at least one sensor comprises a color sensor configured to detect a color of the fluid.

Some embodiments further comprise a rotatable dial positioned around the display on an exterior of the housing; and the controller is configured to receive a signal representing a positioning of the rotatable dial relative to the housing; identify a volume indicated by the positioning of the rotatable dial; and control the actuator and creamer based at least partly on a specified volume of liquid and a specified volume of foam for a pour of the volume. In some embodiments, the rotatable dial is configured to be moved backwards along an axis of its rotation, and the controller is configured to identify selected user interface options based on user movement of the rotatable dial backwards along the axis.

Another aspect relates to a networked draft beer system comprising a smart tap configured for pouring a beer, the smart tap including a housing having a fluid path extending therethrough from an input aperture to an output aperture in a spout of the tap; at least one sensor positioned along the fluid path and configured to generate parameter data representing a parameter of fluid flowing along the fluid path; and a network connectivity module configured to transmit the parameter data over a network; a server remote from the smart tap and including a module configured to connect the server to the network to receive the parameter data; a data repository configured to store the parameter data and data representing draft beer pouring quality standards associated with the beer; an analytics engine configured to analyze the parameter data to determine compliance with the draft beer pouring quality standards; and a recommendations engine configured to generate a recommendation based on the analytics engine analyzing the data, the recommendation representing whether a venue of the smart tap complied with the draft beer pouring quality standards; and cause output of the recommendation to a brewery that brews the beer.

Some embodiments further comprise a plurality of smart taps configured to pour the beer and located at different venues, wherein the data repository is configured to receive and store parameter data from each of the plurality of smart taps, and wherein the recommendation represents whether each of the different venues has complied with the draft beer pouring standards.

In some embodiments, the draft beer pouring standards are configurable by the brewery. In some embodiments, the draft beer pouring standards include a specified temperature for serving the beer, the at least one sensor comprises a thermistor configured to sense temperatures of the beer flowing through the housing, and the analytics engine is configured to determine whether the sensed temperatures correspond to the specified temperature. In some embodiments, the draft beer pouring standards include a specified pressure for serving the beer, the at least one sensor comprises a pressure sensor configured to sense pressures of the beer flowing through the housing, and the analytics engine is configured to determine whether the sensed pressures correspond to the specified pressure In some embodiments, the draft beer pouring standards include a specified quantity of head per glass of the beer, and the analytics engine is configured to determine whether, for each glass of the beer poured through the smart tap, that the glass was provided with the specified quantity of head. In some embodiments, the analytics engine is configured to determine whether the glass was provided with the specified quantity of head based on the parameter data. Some embodiments further comprise a creamer positioned along the fluid path of the smart tap and configured to agitate the fluid and to cause the fluid to transform from a liquid into a foam; and the analytics engine is configured to determine whether the glass was provided with the specified quantity of head based on data received from the smart tap regarding activation of the creamer during pouring of the glass.

Another aspect relates to a networked draft beer system comprising a plurality of smart taps each including a housing having a fluid path extending therethrough from an input aperture to an output aperture in a spout of the tap; at least one sensor positioned along the fluid path and configured to generate parameter data representing a parameter of fluid flowing along the fluid path; and a network connectivity module configured to transmit the parameter data over a network; a server remote from the smart tap and including a module configured to connect the server to the network to receive the parameter data from the plurality of smart taps; a data repository configured to store the parameter data; an analytics engine configured to analyze the parameter data to identify trends in the parameter data; and a recommendations engine configured to generate a recommendation or report based on the analytics engine analyzing the data; and cause output of a user interface to a designated user of the recommendation or report.

In some embodiments, the recommendations engine is configured to generate the recommendation, the recommendation including a beer trending in a particular demographic; and cause output of a user interface to a designated user associated with a bar, the user interface including the recommendation and a user-selectable element configured to enable the designated user to place an order for the beer. In some embodiments, the at least one sensor comprises a flow meter, wherein the parameter data comprises volume of beer flowing through the plurality of smart taps, and the analytics engine is configured to identify that the beer has been poured above a threshold volume or at volumes exceeding a predetermined rate of change over a window of time.

In some embodiments, the analytics engine is configured to analyze aggregate subsets of the parameter data; and identify sales performance of various beers and breweries. In some embodiments, the recommendations engine is configured to generate a report indicating the sales performance of at least one beer of the beers brewed by a brewery compared to other beers, sales of the at least one beer in other regions, or sales of the at least one beer at different bars; and cause output of a user interface to a designated user associated with one of the various breweries, the user interface including the report.

Another aspect relates to a fluid dispensing tap comprising a housing having a fluid path extending therethrough from an input aperture to an output aperture in a spout of the tap; a display positioned on an exterior surface of the housing; and a controller configured to receive parameter data from at least one sensor representing characteristics of a fluid flowing through the tap or a fluid delivery system providing the fluid to the tap; and generate an output for presentation on the display based at least partly on the parameter data.

Some embodiments further comprise a handle coupled to an exterior of the housing; a position sensor configured to generate position data representing whether the handle is in first, second, or third positions; a variable opening valve positioned along the fluid path and configured to be define a variable area across the fluid path; an actuator configured to open and close the variable opening valve; and a creamer positioned along the fluid path and configured to agitate the fluid and to cause the fluid to transform from a liquid into a foam; wherein the controller is configured to in response to receiving position data indicating that the handle is in the first position, close the variable opening valve to stop flow of the fluid along the fluid path; in response to receiving position data indicating that the handle is in the second position, control the actuator to open or close the variable opening valve to the determined extent; and in response to receiving position data indicating that the handle is in the third position, activate the creamer.

In some embodiments, the controller is configured to output alerts or status indicators on the display in real time based on the parameter data. Some embodiments further comprise at least one sensor positioned along the fluid path and configured to generate the parameter data; wherein the at least one sensor comprises a pressure sensor, temperature sensor, and flow meter. Some embodiments further comprise at least one sensor positioned along the fluid path and configured to generate the parameter data; wherein the at least one sensor comprises a color sensor configured to detect a color of the fluid.

Some embodiments further comprise a rotatable dial positioned around the display on an exterior of the housing. In some embodiments, the controller is configured to receive a signal representing a positioning of the rotatable dial relative to the housing; identify a volume indicated by the positioning of the rotatable dial; and update the display based at least partly on the volume. In some embodiments, the controller is configured to identify selected user interface options based on user rotation of the rotatable dial. In some embodiments, the rotatable dial is configured to be moved backwards along an axis of its rotation, and wherein the controller is configured to identify selected user interface options based on user movement of the rotatable dial backwards along the axis.

Another aspect relates to a fluid dispensing tap comprising a housing having a fluid path extending therethrough from an input aperture to an output aperture in a spout of the tap; a creamer positioned along the fluid path and configured to agitate fluid flowing along the fluid path and to cause the fluid to transform from a liquid into a foam; and a controller configured to, in response to receiving a creamer activation signal, activate the creamer to agitate the fluid.

In some embodiments, the creamer comprises an ultrasonic transducer. In some embodiments, creamer comprises an opening in a mechanical valve having a diameter of less than 1 mm. Some embodiments further comprise a rotatable dial positioned around the display on an exterior of the housing; and the controller is configured to receive a signal representing a positioning of the rotatable dial relative to the housing; identify a volume indicated by the positioning of the rotatable dial; and determine a timing and duration for activation of the creamer based on the volume. In some embodiments, the controller is configured to receive pouring instructions over a network, the pouring instructions comprising a specified volume of foam for a beer flowing through the tap; and determine a timing and duration for activation of the creamer based on the specified volume of foam for the beer.

Another aspect relates to a networked draft beer system comprising a server including a data repository configured to store pouring instructions associated with a beer; and a module configured to connect the server to a network and transmit the pouring instructions to a designated smart tap; and a smart tap remote from the server and configured for pouring the beer, the smart tap including a housing having a fluid path extending therethrough from an input aperture to an output aperture in a spout of the tap; a variable opening valve positioned along the fluid path and configured to be define a variable area across the fluid path; an actuator configured to open and close the variable opening valve; and a controller configured to receive the pouring instructions over the network; and during pouring of the beer, control the actuator to open or close the variable opening valve to a determined extent based on the received pouring instructions.

In some embodiments, the smart tap includes a display configured to display a beer selection user interface and user interface controls enabling a user to input information indicating that the smart tap is fluidically connected to a keg containing the beer, and wherein the controller is configured to send the information to the server with a request for the pouring instructions. In some embodiments, the server is configured to store data representing an inventory of a plurality of beers served at a venue of the smart tap; and send pouring instructions to the smart tap for pouring each of the plurality of beers. In some embodiments, the controller is configured to store the pouring instructions for each of the plurality of beers; the smart tap includes a display configured to display a beer selection user interface; the smart tap includes user interface controls enabling a user to make selections from the user interface; and the controller is configured to cause the display to present, in the beer selection user interface, a list of the plurality of beers; and in response to receiving user input selecting the beer from the list, configure the smart tap to pour the beer according to the stored pouring instructions associated with the beer.

In some embodiments, the smart tap includes a creamer positioned along the fluid path and configured to agitate the fluid and to cause the fluid to transform from a liquid into a foam, wherein the pouring instructions include a specified quantity of foam per glass of the beer, and wherein the controller is configured to activate the creamer for each glass of beer poured through the smart tap to produce the specified quantity of foam. In some embodiments, the pouring instructions are configurable by a brewery that brews the beer, and the server is configured to receive the pouring instructions from the brewery over the network.

Some embodiments further comprise a mobile device configured with an application that allows a user to identify the beer that is fluidically connected to the smart tap and to send information regarding the beer to the server; wherein the server is configured to identify that the beer is not represented in the data repository; identify the pouring instructions based on pouring instructions for another beer analogous to the beer or based on default pouring instructions for a style of the beer; and update the data repository to include the beer.

Another aspect relates to a networked draft beer system comprising a smart tap configured to dispense a beer, the smart tap including a housing having a fluid path extending therethrough from an input aperture to an output aperture in a spout of the tap; at least one sensor positioned along the fluid path and configured to generate parameter data representing a parameter of fluid flowing along the fluid path; and a network connectivity module configured to transmit the parameter data over a network; a server remote from the smart tap and configured to receive the parameter data; determine a remaining inventory of the beer based on the parameter data; compare the remaining inventory to automated ordering settings of a venue of the smart tap; and in response to determining that the remaining inventory is less than an amount specified in the automated ordering settings, automatically place an order for at least one additional keg of the beer with a brewery of the beer or a distributor of the beer.

Another aspect relates to a networked draft beer system comprising a smart tap configured to dispense a beer, the smart tap including a housing having a fluid path extending therethrough from an input aperture to an output aperture in a spout of the tap; at least one sensor positioned along the fluid path and configured to generate parameter data representing a parameter of fluid flowing along the fluid path; and a network connectivity module configured to transmit the parameter data over a network; a server remote from the smart tap and configured to receive the parameter data; determine a remaining inventory of the beer based on the parameter data; compare the remaining inventory to ordering settings of a venue of the smart tap; and in response to determining that the remaining inventory is less than an amount specified in the ordering settings, provide an alert to a user regarding the remaining inventory.

Some embodiments further comprise a mobile device configured to receive the alert and, in response, display a user interface including a user-selectable element that enables the user to place an order for at least one additional keg of the beer with a brewery of the beer or a distributor of the beer. In some embodiments, the mobile device is further configured to display a purchasing order user interface responsive to the user placing the order, and the purchasing order user interface comprises an additional user-selectable element that enables the user to approve the purchase order. In some embodiments, the mobile device is further configured to send the approved purchase order to the server for forwarding to the brewery or distributor or to send the approve purchase order to the brewery or distributor.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Introduction

Figure 1:
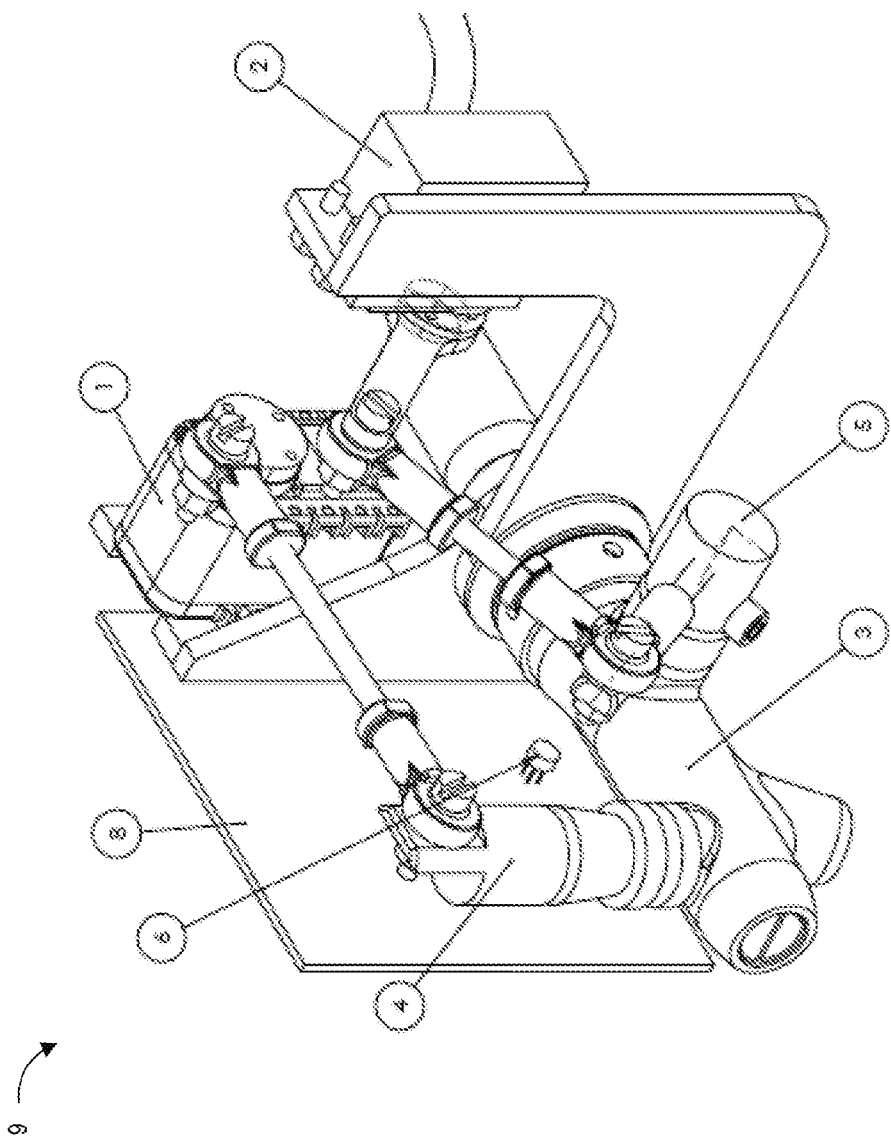
FIG. 1 depicts a perspective view of one example of a smart beer tap.

Embodiments of the disclosure relate to systems and techniques for real-time sensing of one or more beer parameters, draft beer pouring control based on specified quality standards and the sensed beer parameters, and/or usage of the sensed data in a network environment, for example for inventory management, quality control, and providing bar to brewery and brewery to bar recommendations.

The smart beer tap includes a housing coupled to the draft beer tower. The housing can be formed from a single piece of material or from multiple joined parts, and includes an entrance opening configured to receive beer from the tower, the tap spout from which beer is poured into a glass, and a fluid path leading from the entrance opening to the tap spout. The tap also includes a dial and a handle provided on the exterior of the housing, and a user can turn the dial to select what volume of beer will be poured from the tap when they pull the handle. The handle conveniently can be positioned and operated similarly to handles of existing taps in order to facilitate ease of use of the smart tap, and can be interchangeable with customized tap handles provided by breweries. The tap includes a display provided on the housing, for example on a front face between the handle and the spout, that can display sensed beer parameters and certain menu options relating to maintenance of the draft beer system and to functionality of the pouring options provided by the tap.

The housing of the tap internally houses a variable opening valve, a creamer, and one or more sensors positioned along or within the fluid path, as well as control electronics configured to receive data from a number of sensors and control the valve and creamer as described herein based on the received data. The control electronics can include an electronic hardware processor and a memory configured to store variable valve opening instructions and creamer control instructions, display control instructions, data communications instructions, beer characteristic data, and the various types of data described herein. The tap also includes a wireless or wired connectivity module (e.g., GSM connectivity to send sensor data to cloud, Bluetooth to send data to devices in a local region of the tap, LTE Cat M1 cellular network connection, or narrow band IoT ("NB IoT")).

The sensors positioned along or within the fluid path can include one or more of a pressure sensor configured to sense the pressure of beer in the keg or flowing through the tap, a pressure sensor configured to sense the ambient pressure around the tap, a flow sensor to volumetrically track beer flowing through the tap, one or more temperature sensors configured for sensing the temperature of beer and positioned at the input of the housing, the output (spout) of the housing, or at any point located therebetween, a temperature sensor to sense the ambient temperature around the smart tap, and a color sensor configured to determine the color of fluid flowing through the tap or out of the tap spout. Optionally, the tap can include additional sensors on the exterior of the housing, and can communicate with remote sensors located in the draft beer system and/or environment. Such sensors can include a humidity sensor and one or more temperature sensors positioned outside of the tap (for example, temperature sensors at the keg or along the beer line or in the ambient environment), and can be configured to communicate their data to the tap (for example, using a network as described with respect to FIG. 7). Beneficially, the smart taps described herein are configured with instructions for variable flow control that minimizes the amount of foam that occurs during the pour of a glass of beer by adjusting flow rate with respect to sensed data. In some embodiments, other sensors can be included that provide information relating to chemical/physical properties of the beer, for example, pH, alkalinity, or a particular element, mineral or salt content.

The disclosed taps further include a creamer mechanism in the tap housing positioned in the flow path of the beer through the tap. The creamer mechanism can be selectively activated, based on pre-specified instructions, to cause the beer to froth in order to provide a specified quantity of head, or ratio of liquid beer to head. Accordingly, the creamer mechanism can additionally be controlled to create head quantities or ratios as specified for particular beers and/or different styles of beer (e.g., stout, hefeweizen, pilsner, pale ale, etc.). The creamer can be mechanical or use ultrasound to create the head. The variable flow valve and creamer mechanism can be cooperatively controlled as described herein to pour each glass a precise amount of bear with optimal foam at an ideal temperature. As such, the disclosed taps provide consistent, high-quality pours even when beer parameters vary.

Advantageously, the disclosed smart beer taps provide real-time information to bartenders, bar management personnel/systems, and/or other parties regarding current parameters (e.g., temperature and pressure) of beer in the cooled keg storage as well as in the draft beer tower and tap. This information can be conveniently provided at the pouring point via the display screen on the tap, and thus beneficially does not require usage of bar space for a separate display nor does it require the bartender to check a separate device or application in order to identify the beer parameters. The display can also be used to provide maintenance reminders, and can display alerts when sensed parameters indicate potential problems with the keg, beer line, beer, cooling system, gas pressure, draft beer tower, or tap. The tap can be configured to identify specific problems that are likely occurring based on the sensed parameters and to recommend corrective actions to fix the problems. When the bartender approaches a tap designed according to the present disclosure, he or she can easily identify based on the display whether the beer is in proper condition for pouring and, if not, can be presented with recommendations regarding any corrective action that should be taken to fix the draft beer system and return the draft beer to its desired quality for pouring.

Another advantage of the disclosed taps is that the tracked flow of beer through the tap enables bars to accurately track inventory by identifying issues such as untraced sales and waste resulting from spillage, foam, and over-pouring. Bar management can compare actual sales to actual volume of dispensed beer to quantify the performance of specific bartenders, identify any issues, and provide further training if needed. The sensor data from the disclosed taps can be used to mitigate losses due to waste (spillage, over-pouring, foam pour-out) and fraud. For example, the disclosed taps prevent or mitigate spillage during each pour by delivering a controlled volume of beer and head. A bartender can turn the dial of the housing to correspond to the glass size, and when the bartender pulls the tap handle the tap can automatically fill the volume of the glass with a specified quantity of beer and head. Thus, the bartender can serve beers efficiently using a simple, familiar gesture with portion control and beer quality assurance. Further, the tap can use sensed parameters to identify when a keg or tube is finished or when there is a line problem and alert the bartender, thereby reducing the waste that typically occurs when a bartender tries to pour draft beer during such conditions.

Some embodiments of the disclosed taps can be used with glass supports that position a glass in the right position and at the correct angle for pouring such that a bartender can use the disclosed smart taps to perform hands-free pouring. The tap controls can include a mode where a simple pull of the handle initiates the entire pouring of a glass of beer, so that the bartender does not have to maintain his or her grip on the handle through the duration of the pour. This can increase efficiency and/or throughput of draft beer served to consumers, as the bartender can parallelize pouring and payment, and can pour multiple beers at once. This can increase bar profits, particularly during busy hours. Some embodiments of the smart taps can include card swipe readers, card chip readers, or other digital payment acceptance devices to further streamline the draft beer process.

The disclosed taps can beneficially provide transparency to breweries relating to the quality of their beer that is poured by various bars or other vendors. For example, a brewery can specify beer pouring parameters according to their quality standards regarding what conditions they prefer for the beer served to consumers. The beer pouring parameters can include, for example, one or more of temperature, pressure, and ratio of liquid beer to head, and may be specific to a particular beer or style of beer brewed by the brewery. Data received from the sensors of the smart tap from which a particular brewery's beer is being poured can be sent to a remote server (e.g., a cloud-based data repository) and accessed by breweries, or may be sent directly to the breweries. The personnel of the breweries can review such data to monitor compliance with their specified quality standards. Further, some embodiments of the remote server can automatically compare the received sensor data to the quality standards, and can provide reports to the breweries regarding bar compliance or non-compliance. The remote server can additionally include a recommendations engine to provide recommendations to breweries regarding bars that are likely or unlikely to comply with their quality standards based on analysis of historical pouring parameter data received from such bars. The remote server can provide services to bars relating to order and inventory management, recommended new beers, and fraud detection.

Although the present disclosure refers to "bars" as the entity selling draft beer, it will be appreciated that the disclosed smart taps are suitable for use in any draft beer environment including the breweries themselves, pubs, restaurants, festivals, tap rooms, stadiums, and the like. Accordingly, the usage of bar herein can be synonymous with other types of draft beer vendors.

The present disclosure presents various examples within the context of draft beer delivery. However, the disclosed taps can be used for delivery of other beverages in other examples. Particularly, the disclosed taps provide advantages for delivering beverages that desirably include a liquid portion and a foam portion where the foam can be formed by dynamically during pouring, for example by changing flow conditions and/or temperature of the liquid, and/or by agitating the liquid. As such, variations of the disclosed taps may be suitable for use in pouring certain coffee beverages including lattes and cappuccinos which include an intentionally-foamed portion of milk. The disclosed taps are also suitable for delivery of cold brew coffee and wine, to name a few more examples.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Smart Beer Tap Embodiment

An object of this embodiment is to ensure that the beer present within a beer keg is poured from the beer line between the beer keg and a tap into a glass via said tap in an optimum duration by means of the dynamic flow rate control depending on the tap temperature and the ambient temperature and the pressure in the beer line.

Another object of this embodiment is to ensure that the beer present within a beer keg is poured from the beer line between the beer keg and a tap into a glass via said tap with the desired extent of beer head depending on the tap temperature and the ambient temperature and the pressure in the beer line.

Another object of this embodiment is to enable the amount of beer flowing through the tap to be sent to an IP address via wired or wireless methods so that the sales data, sensor data, and maintenance process data of the enterprise may be monitored.

In accordance with these objects, the subject of the invention is a smart beer tap wherein said smart beer tap is characterized in that it comprises the following.

A tap.

A tap open/close arm.

A tap flow rate regulating arm, which provides control over the increase and decrease of the flow rate setting of the beer poured from the tap, e.g. the amount of beer passing in unit time, by a command issued according to the temperature and pressure values.

Tap and ambient temperature sensor for detecting the tap temperature and the ambient temperature.

A flow sensor fixed to the beer line side of the tap, which detects the flow rate of the beer coming from the beer keg via the beer line and thus enables the amount of beer required to be dispensed from the tap to be determined according to the detected flow rate.

An electronic card containing the wired or wireless communication interface that serves to send to an IP address the amount of beer passing through the beer line and the interfaces that serve to evaluate the feedbacks coming from the tap and ambient temperature sensor and from the flow sensor.

Figure 2:
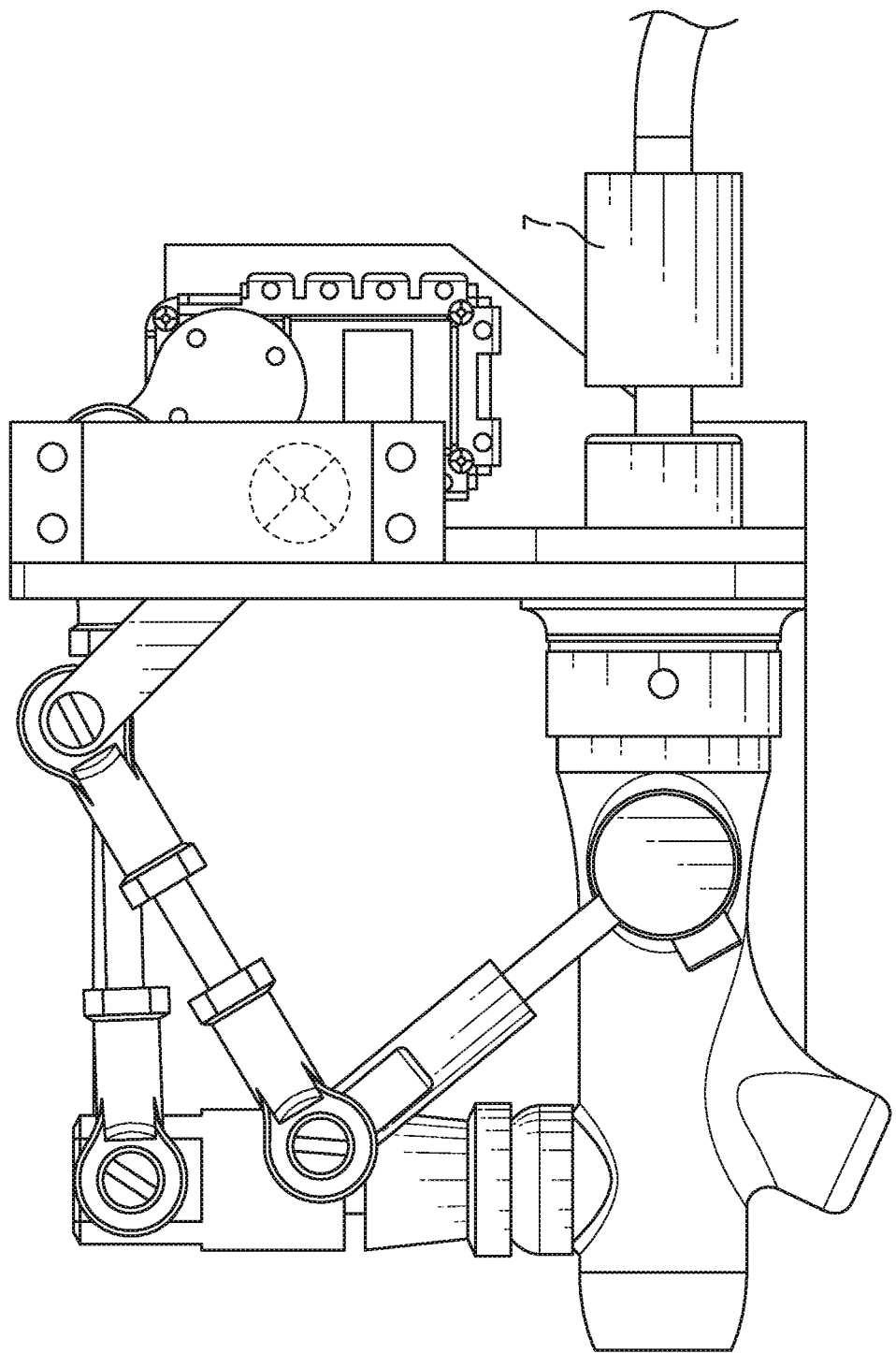
FIG. 2 depicts a side view of the smart beer tap of FIG. 1.

FIG. 1 depicts a perspective view of one example of a smart beer tap, and FIG. 2 depicts a side view of the smart beer tap of FIG. 1. FIGS. 1 and 2 are discussed together below. Certain components in FIGS. 1 and 2 are labeled with the reference numerals as indicated below:

1. Tap open/close arm motor
2. Tap flow rate regulating arm motor
3. Tap
4. Tap open/close arm
5. Tap flow rate regulating arm
6. Tap and ambient temperature sensor
7. Flow sensor
8. Electronic card
9. Smart beer tap The embodiment of a smart beer tap (9) of FIGS. 1 and 2 is capable of performing dynamic flow regulation while pouring beer from a beer keg into a glass. The flow regulation can be based on sensed parameters including the temperature and pressure parameters, and can additionally be regulated according to the desired amount of beer and the desired amount of head. Accordingly, the smart beer tap (9)

comprises the tap open/close arm motor (1), tap flow rate regulating arm motor (2), tap (3), tap open/close arm (4), tap flow rate regulating arm (5), tap and ambient temperature sensor (6), flow sensor (7) and electronic card (8).

The smart beer tap (9) is operated under control of an electronic card (8) that stores and executes the operating instructions for the smart beer tap (9). The electronic card (8) can be fixed to any region of said smart beer tap (9). The electronic card (8) operates the smart beer tap (9) based on (i) determining the amount of beer and amount of head demanded, for example as is entered via a user interface (e.g., presented on a touchscreen electronically connected to said electronic card (8)), (ii) the temperature value and the pressure value of the beer coming from the beer keg, which are detected by means of the tap and ambient temperature sensor (6) fixed to any location of the smart beer tap (9), and (iii) the flow sensor (7) fixed to the beer line side of the tap (3). As a result, the tap flow rate regulating arm (5), which is fixed on the tap (3), is able to be directed in a variable manner by the variable tap flow rate values as determined via the electronic card (8). The flow rate values can be determined by evaluating, together or in various sub-combinations, the tap and/or ambient temperatures and flow pressure data detected by means of the tap and ambient temperature sensor (6) and the flow sensor (7). Additionally or alternatively, the flow rate values can be determined based on the desired amount of the beer head, i.e. based on the criteria such as low, high or medium.

The tap flow rate regulating arm (5) is activated by means of the tap flow rate regulating arm motor (2). At the same time, by way of opening the tap open/close arm (4), which is fixed on the tap (3) and which is activated by means of the tap open/close arm motor (1), the beer is enabled to be poured from the tap (3) into the glass in an desired manner at a variable flow rate depending on the parameters described above. In other words, it is possible to control in a variable manner the flow rate of the beer to be poured by means of the tap flow rate regulating arm (5), which is driven by the tap flow rate regulating arm motor (2), wherein the flow rate may be controlled in a dynamic manner according to the variable state of the flow rate value, the variable state owing to the filling patterns defined in the instructions of the electronic card (8), based on the varying values of the tap and the ambient temperature, and/or according to the amount of beer head selected by the user, such as a low, high, or medium amount of beer head or a particular volume of beer head.

In one example, a low amount of beer head is specified and the tap is in a warm state. Based on these inputs the electronic card (8) detects that the flow rate should be low and causes the tap flow rate regulating arm (5) is to be opened in a way to permit a flow rate compatible with said detected requirement of low flow state. In another example, a high amount of beer head is specified and the tap is at a medium temperature. Based on these inputs, the electronic card (8) detects that the pouring process should be performed in a quick manner and causes the tap flow rate regulating arm (5) to be opened in a way to permit a flow rate compatible with said detected high flow state.

The electronic card (8) includes the wired or wireless communication interface that operates to send (e.g. to a specified IP address) data representing the amount of beer passing through the beer line. The electronic card (8) includes interfaces configured to evaluate and process the data coming from the tap and ambient temperature sensor (6) and the flow sensor (7). The electronic card (8) may be fixed to any region of the smart tap.

Overview of Additional Smart Beer Tap Embodiments

Figure 3A:
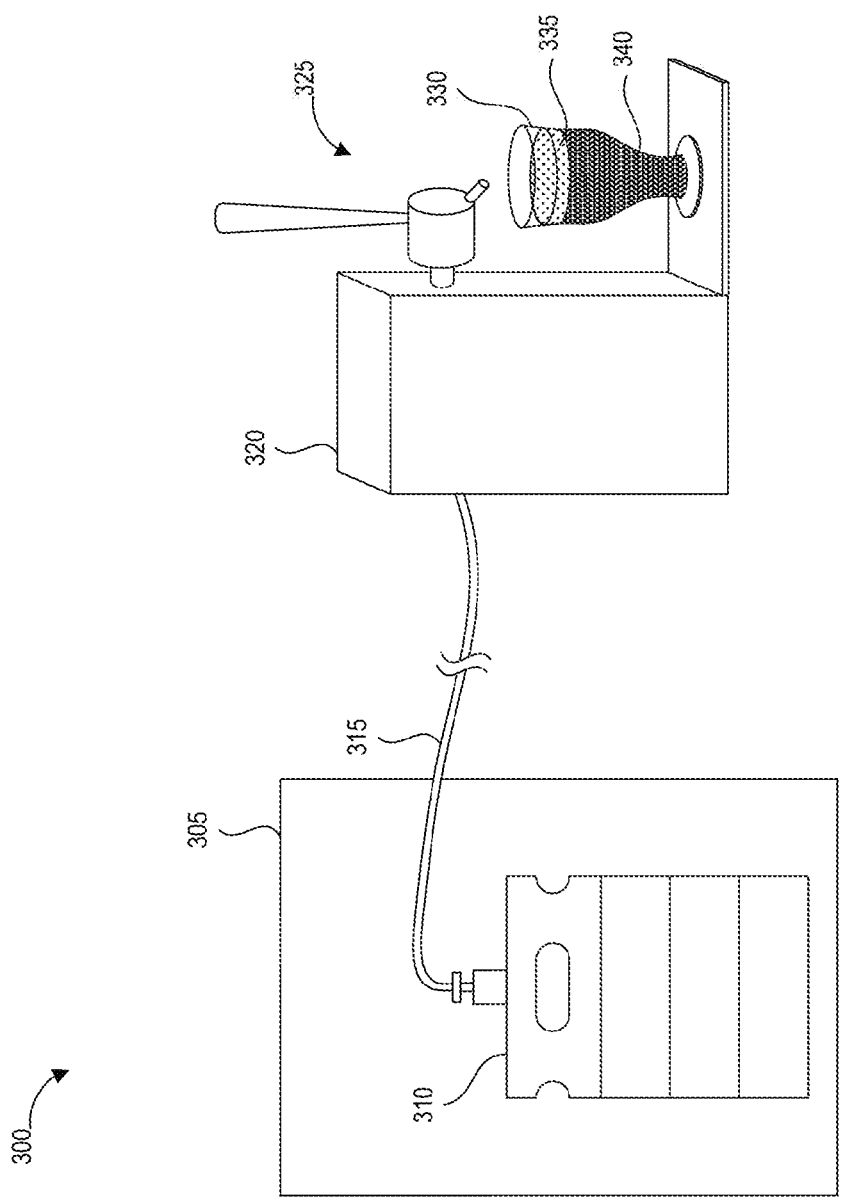
FIG. 3A depicts an example draft beer system implementing a smart tap as described herein.

FIG. 3A depicts an example draft beer system 300 implementing an embodiment of a smart tap 325 as described herein. The draft beer system 300 includes temperature-controlled storage 305 containing a beer keg 310, a draft beer tower 320, a beer line 315 leading from the beer keg 310 to the draft beer tower 320, and the smart tap 325. Also illustrated is an example of a glass 330 of beer poured from the smart tap 325. The glass 330 contains a quantity of liquid beer 340 and a quantity of head 335. Though depicted with a draft beer tower 320, the disclosed taps can be used with draft beer walls provided for example on the outside of temperature-controlled storage 305 room, or with other suitable draft beer serving structures.

The temperature-controlled storage 305 is configured to keep the beer keg 310 at a predetermined temperature, for example via a refrigeration system. The beer keg 310 contains a volume of beer, and may be acquired from a particular brewery. Although not illustrated, the beer keg 310 can be coupled to a tank or cylinder of pressurized gas in order to facilitate transfer of the beer out of the keg through the beer line 315. The beer line 315 provides a fluid transfer path between the beer keg 310 and the draft beer tower 320. The tap 325 can be operated by a user (for example a bartender) in order to dispense beer from the keg 310 into a glass 330. Thus, a beer delivery fluid path is formed from the keg 310 through the beer line 315 through the draft beer tower 320 to the tap 325.

A number of sensors can be positioned at points along the beer delivery fluid path, for example within or on the tap 325, in order to sense parameters of the beer. Such parameters include temperature, pressure, and color. In various embodiments, temperature and pressure can be sensed at or within any of the keg 310, beer line 315, draft beer tower 320, and tap 325, using one or more sensors positioned at these locations. Color can be sensed as the beer is flowing through the beer line 315, draft beer tower 320, and/or tap 325 to determine whether the beer is in a liquid or foam state. For example, liquid beer may be any of a range of colors from dark brown to a light amber, while foam is typically cream or white. As such, if the color of the beer is sensed as being cream or white, the tap 325 can identify that the beer will be dispensed as head. A color sensor can include an image sensor (e.g., a photosensitive substrate such as a CMOS, CCD, or pin-diode image sensor), a source of illumination (e.g., LED light) positioned and configured to illuminate the beer in the field of view of the image sensor such that light reflected from or transmitted through the beer is received at the image sensor, and optionally an image signal processor configured to analyze signals received from the image sensor and determine the sensed color of the beer. In some embodiments the controller of the tap 325 can be configured to perform such image signal processing based on data received from the image sensor. Some examples of the color sensor can include optical materials (e.g., lenses, optical fiber, reflective components) for directing and/or focusing the provided illumination and/or received light. In some examples, the color sensor can be positioned with a field of view that observes beer being poured from the tap 325 through the ambient environment, and in such examples the source of illumination may be omitted. Sensors can also be positioned within the draft beer system 300 to sense parameters of the system that relate to how the beer will pour, for example ambient temperature and humidity sensors. However, in some embodiments all of the sensors are contained within and/or provided on the tap 325.

As described herein, the tap 325 can include a variable opening valve, creamer mechanism, and corresponding control instructions for dynamically determining flow conditions for beer flowing through the tap 325 in order to pour a specified quantity of the liquid beer 340 and a specified quantity of the head 335 into the glass 330 based on sensed parameters of the beer and/or draft beer system 300. The specified quantities can be determined based on a style of the beer. For example, the tap control instructions can specify the volume of the liquid beer 340 and the volume of the head 335 that should be poured for a particular style of beer into a glass of a particular size. Such volumes can be determined based on experimental data indicating a preferred quantity of head 335 for a style of beer (and optionally for a particular volume of the style of beer). The specified quantities can be customized by a brewery or other system user in some embodiments, such that the volume of head 335 for a particular beer or brand of beer (e.g., beers from the same brewery) can deviate from the volume of head 335 generally specified for other beers of the same style. This beneficially enables a brewery to dictate the quantity of head 335 for beers brewed at the brewery, for example the quantity that the brewery desires in order to provide the consumer with their preferred quality of glass of beer.

Although FIG. 3A depicts a single keg 310 and beer line 315, and shows a side view of the draft beer tower 320 with one tap 325, embodiments of the draft beer system 300 can include multiple such beer delivery fluid paths. For example, a number of beer kegs 310 can be contained in the temperature-controlled storage 305 (or in multiple such storage areas if different temperatures are required). Each keg can be coupled to its own beer line 315, with each beer line leading to the draft beer tower 320.

Figure 3B:
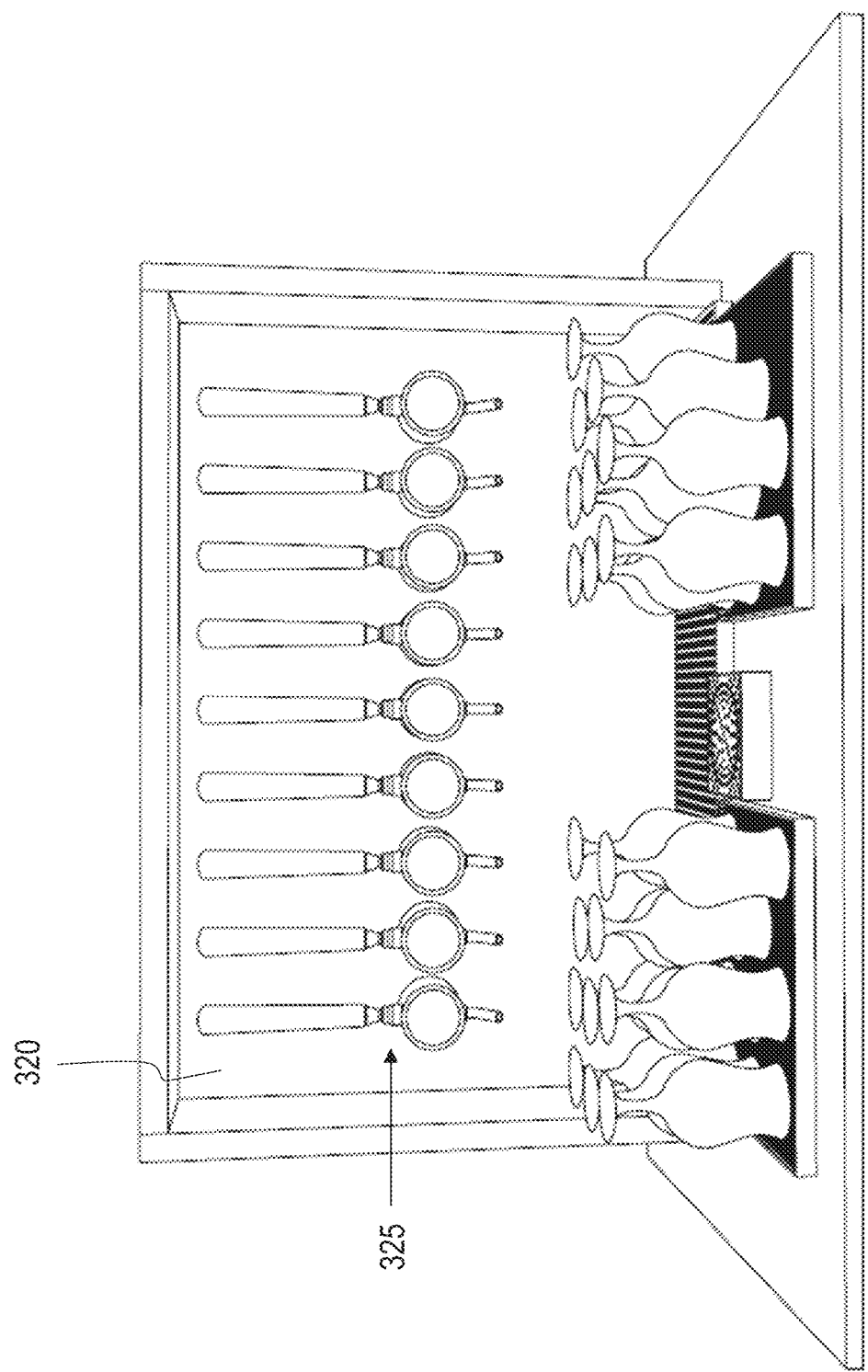
FIG. 3B depicts a front view of a draft beer wall that can be used as an alternative to the draft beer tower of FIG. 3A.

FIG. 3B depicts a front view of a draft beer wall that can be used as an alternative to the draft beer tower of FIG. 3A, and illustrates how a number of taps 325 can be provided on a draft beer wall with each tap fluidically coupled to one of the beer lines and configured specifically for pouring the particular beer in the keg coupled to the beer line. In order to indicate to one of the taps which beer is flowing through it, in some embodiments the bartender or a bar employee can select a beer from the tap, or can select from a menu on a mobile app (software application) or web-based app. The data of that beer as selected in the app can be sent from a centralized beer database to the smart tap (see for example the networked environment of FIG. 7, described below). Each tap 325 can be independently operated based on sensed parameters of the beer flowing through that tap, the style of the beer, and/or any beer-specific settings for that particular beer. As such, each tap 325 may deliver a different volume of head 335 as specified by the instructions corresponding to the beer flowing through the tap and based on the parameters sensed in real time. FIG. 3B illustrates the display screens on the user-facing side of each of the taps.

As used herein, "real time" can refer to sensing, processing, and system operations that occur while fulfilling a consumer order for a beer. For example, beer and/or system parameters can be sensed when the bartender uses the tap 325 to dispense a beer to fulfill the order, and the tap 325 can determine flow conditions for pouring the beer based on the sensed parameters and the control instructions. The parameters can be sensed periodically during use of the system 300, initially when the tap is activated (e.g., by a handle pull), intermittently as the beer is poured from the tap, or continuously as the beer is poured from the tap.

The displays on the taps 325 can beneficially be used to provide reminders regarding line cleaning maintenance for the beer lines 315. Beer lines should be flushed with a cleaning solution periodically, for example every two weeks, in order to ensure that the beer poured through the taps is not contaminated by bacteria and debris that builds up in the beer lines over times. Providing such a reminder directly on the tap 325 can increase the regularity of beer line maintenance, leading to higher-quality pours and increased food safety.

Figure 4B:
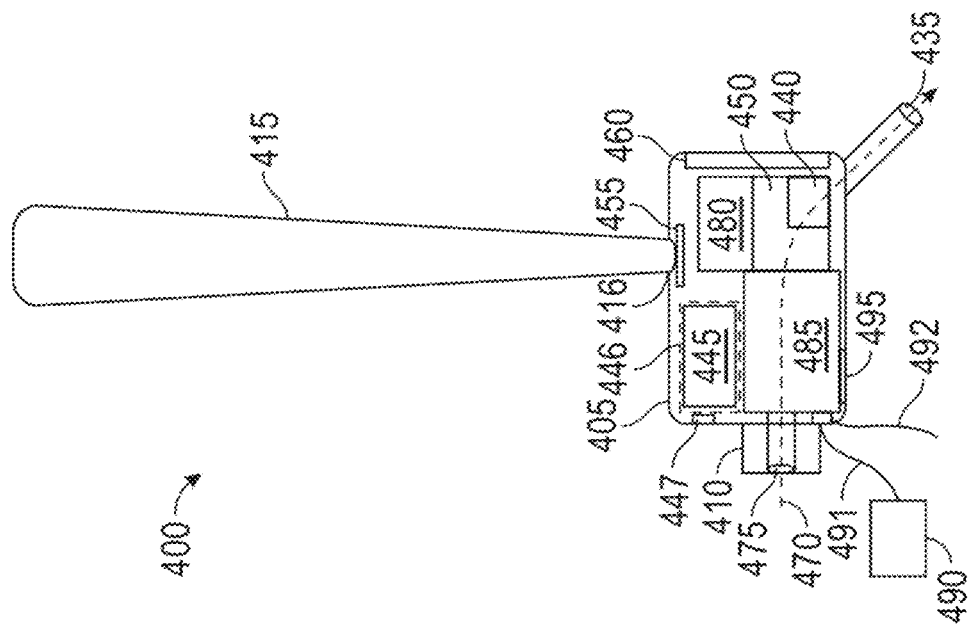
FIG. 4B illustrates a schematic block view of the interior of the smart tap of FIG. 4A.
Figure 4A:
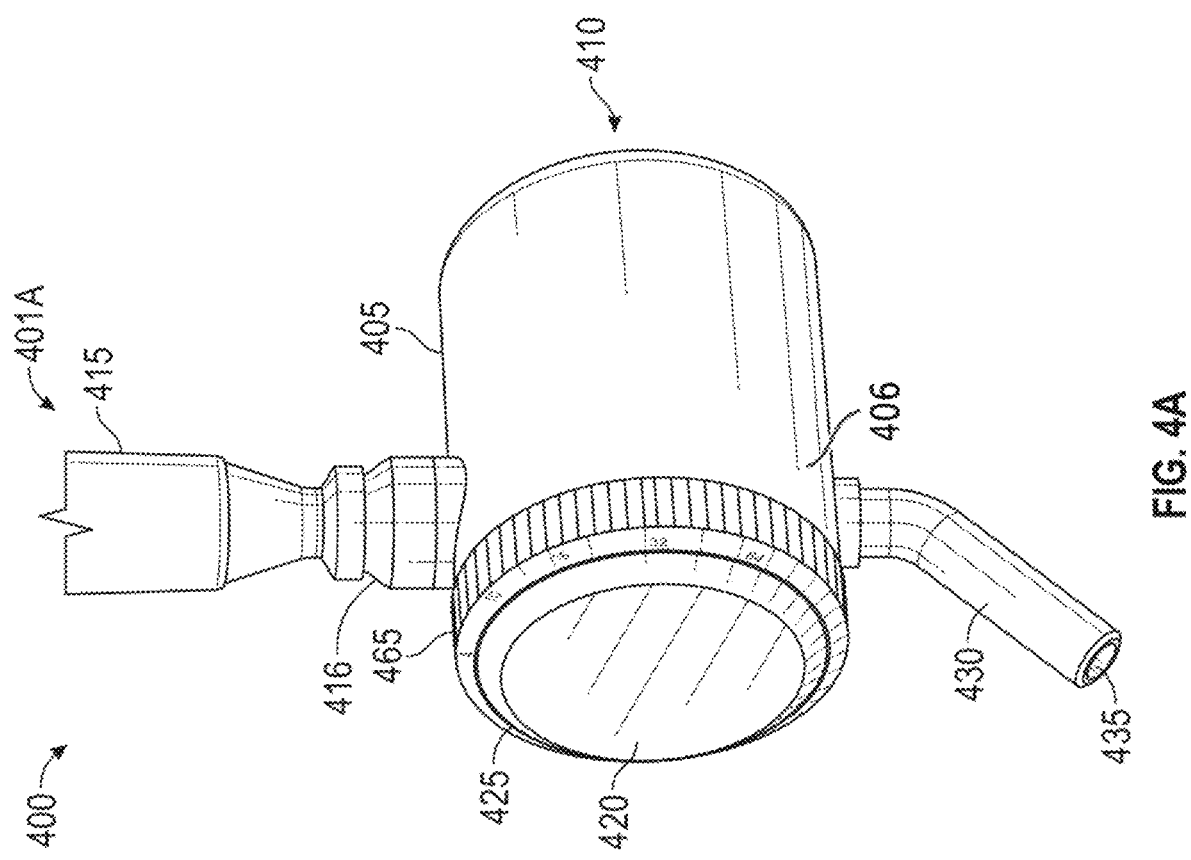
FIG. 4A illustrates an exterior view of an embodiment of a smart tap as described herein.

FIG. 4A illustrates an exterior view of an embodiment of a smart tap 400 as described herein, and FIG. 4B illustrates a schematic block view of the interior of the smart tap of FIG. 4A. The smart tap 400 can be used as the smart tap 325 in the draft beer system 300. FIGS. 4A and 4B are discussed together below.

As illustrated in FIG. 4A, the smart tap 400 includes a housing 405, a dial 465, handle 415, handle connection 416, display screen 420, and tap spout 430 with an exit aperture 435 configured to dispense beer that has flowed through the smart tap 400. As illustrated in FIG. 4B, the housing 405 houses sensor(s) 485, variable opening valve 450 and its actuator 480, creamer 440, controller 445, printed circuit board (PCB) 455, a coupling 410 for coupling mechanically and fluidically to a shank of a draft beer tower 320 (or for coupling directly to a beer line in some portable draft beer dispensing embodiments), port 447, power supply 490, maintenance mode switch 495, and the display electronics 460. The sensor(s) 485, creamer 440 and variable opening valve 450 are positioned along fluid path 470 leading from entrance aperture 475 to exit aperture 435.

The controller 445 includes at least one electronic hardware processor ("processor") and at least one associated memory component ("memory"), the electronic hardware processor being in communication with the memory. The memory can include a computer-readable medium configured to store variable valve opening instructions and creamer control instructions, for example as described with respect to FIG. 10 below. The computer-readable medium can also be configured to store display control instructions and data communications instructions. The memory can also include a data repository configured to store beer characteristic data representing the beer currently configured to flow through the tap, historical sensed parameter data, historical flow conditions of beer poured through the tap, and historical maintenance data. The memory can be configured to store predetermined windows of such data, and the controller 445 can be configured to periodically clear data from timeframes older than the predetermined windows. The controller 445 may first confirm that such data has been sent to a remote data repository before clearing. The processor(s) of the controller 445 can execute the stored computer-readable instructions and process the described sensor data to cause operation of the tap 400. In the illustrated embodiment, controller 445 is surrounded by insulation 446.

Controller 445 can also include a communication module. The communication module can be, for example, an antenna, a cellular modem, Bluetooth, wireless (e.g., 802.11 Wi-Fi connection), or wired network connection to enable the tap 400 to send and receive data over a network (e.g., satellite communications network, local area network, or large area network such as the Internet). One example of a suitable antenna can provide 2.4 GHz Wi-Fi, Bluetooth, or Low PAN connectivity as well as one of the following additional connections: GSM/GPRS Quad Band, LTE CAT M1, NB-IoT. For example, a Bluetooth connection may pair the tap 400 with the personal computing devices (e.g., tablets, smartphones, smart watches, smart glasses, etc.) of bar managers, bartenders, and bar service personnel. This pairing can be used in some examples to update tap settings (e.g., beer style and/or brand, service amounts, quality parameters, foam type, and the like). A Wi-Fi connection can connect the tap 400 to a bar network to send data to and receive data from remote servers. A GSM/GPRS, LTE CAT M1, or NB-IoT connection can be used to send data to and receive data from remote servers. Wireless connectivity can be used to update device firmware on the field. The devices can send and receive encrypted data.

The stored instructions and/or data may be accessed via a wireless network connection and/or a wired connection with another device to the port 447, which can be a USB (e.g., standard USB, micro-USB, USB-C) port in some examples. Port 447 can also provide programming access for updating the controller 445. The port 447 can be waterproof.

The sensor(s) 485 can include one or more of a flow meter, temperature sensor, pressure sensor, and color sensor. The sensors can be provided within a sensor box as shown, or can be positioned spaced apart along the fluid path 470 as desired based on the parameters to be sensed. The sensors can be provided within the housing 405 as shown, or on the exterior of the housing as needed. The flow meter can include a turbine flow meter configured to generate pulses as beer flows through or past the flow meter, and the controller 445 can interpret the pulses as different flow rates, for example based on their periodicity. Temperature sensors can include a thermistor for direct measurement of beer temperature, and/or an ambient temperature sensor. Pressure sensors can include a pressure sensor to measure liquid pressure flowing through the tap 400 and/or an ambient pressure sensor.

As described above, a color sensor can be an imaging device and a source of illumination. For example, an RGB (or clear) LED can illuminate the sensor chamber 485 under control of the controller 445 and/or its own microprocessing unit. The illumination can be attenuated by the fluid within the sensor chamber and received by an image sensor. One example color sensor can be a color light-to-digital converter inter-integrated circuit ($I^2C$) and IR filter. The image sensor of this example includes clear, red, green, and blue color filters (band-pass filters) arranged in a pattern over photodiodes of the photosensitive substrates, and signals from these photodiodes provide a digital return of red, green, blue (RGB), and clear light sensing values. The clear channel received from the image sensor can be used as a reference to allow for isolation of color content. The color sensor can include an infrared (IR) blocking filter that is integrated on-chip and localized to the color sensing photodiodes in order to minimize the IR spectral component of the incoming light, thus allowing color measurements to be made accurately. The high sensitivity, wide dynamic range, and IR blocking filter make this color sensor a suitable solution for use under varying lighting conditions and through attenuating materials. The data from this example color sensor is transferred via an $I^2C$ to the controller 445. The controller 445 can use the data from the image sensor to determine the color of the beer flowing through the tap 400, and can further determine the style of beer based on the determined color. The controller 445 can additionally or alternatively use the data from the image sensor to determine the type of fluid flowing through or positioned within the tap 400, for example to determine whether the fluid is beer, foam, cleaning liquid, water, or gas.

The variable opening valve 450 is configured to be opened at a range of different diameters by actuator 480 in order to selectively control the rate of fluid passing through the tap. For example, the variable opening valve 450 can control beer flow speeds between 0 cl/s and 7 cl/s with a single actuator, and can provide non-turbulent beer flow within this speed range. The variable opening valve 450 can operate up to 50 psi in some examples, and is made from food-grade material that is resistant to deterioration due to caustic liquids and beer line cleaning liquids. The diameter of the aperture of the valve 450 can be determined by the controller 445 as described herein, such that the actuator 480 is controlled via electronic signaling from the controller 445. The creamer 440 is configured to agitate, or cause turbulence in the flow of, liquid beer flowing through the creamer. As such, the creamer 440 can be selectively activated by the controller 445 in order to produce the desired quantity and optionally consistency of head.

In one embodiment, the variable opening valve 450 includes a pinch valve and associated actuator 480, and the creamer 440 includes an ultrasonic transducer. By using a pinch valve, the tap 400 can control both the flow rate and on/off (e.g., open/closed) setting of the tap with a single actuator. The controller 445 can activate the creamer 440 to emit ultrasonic radiation into the beer flowing through the creamer 440 in order to convert liquid beer to a dense, creamy foam. In one example, a 40 kHz sinusoidal signal is generated and amplified up to 300 Volts and supplied to the ultrasound transducer to create desired bubble forms (e.g., with sub-millimeter sized bubbles). The ultrasound transducer can be placed onto tubing within the housing 405 that has a high transmissivity at that frequency.

In another embodiment, the variable opening valve 450 includes a mechanical valve and associated actuator and the creamer 440 is also a mechanical structure, for example incorporated into the mechanical valve. The creamer 440 can be an opening between 200 μm to 1 mm inside of the mechanical valve. In one embodiment, the creamer can be mechanically actuated, for example by actuator 480, in order to agitate the beer via a mechanical opening. Such embodiments may require a second actuator and valve to control the on/off setting of the tap, and the controller 445 can control actuation of both actuators in tandem to achieve the desired flow.

Although the variable opening valve 450 is illustrated as being positioned prior to the creamer 440 along the fluid path 470, in other embodiments this positioning can be reversed. The creamer 440 and variable opening valve 450 can be positioned directly adjacent as shown or spaced apart along the fluid path 470, and each can be positioned at any point along the fluid path 470 between the entrance aperture 475 and the exit aperture 435.

The actuator 480 can be a DC motor, Servo motor, step motor, or linear actuator. The displacement and movement speed of the actuator 480 can be controlled via electrical signals supplied from the controller 445. Such signals can be dynamically adjusted during beer pouring to stabilize the flow rate based on feedback gathered from a flow meter in real time, or from the other disclosed sensors. This can ensure reliability regardless of the changing pressure levels of the draft system over time.

The embodiment of FIGS. 1 and 2 receives user input via a touchscreen, for example selections of beer volume and amount of head, as well as a pour command that causes the smart tap 9 to dispense beer according to selected and programmatically-determined parameters. However, the longstanding and traditional bartending practice involves pulling a handle on a tap in order to pour beer from the tap.

As such, some bartenders may prefer a smart tap that comports with this familiar tap control.

Accordingly, the smart tap 400 includes handle 415 that is configured to be pulled by the bartender to cause the smart tap 400 to pour beer. The handle 415 couples to tap 400 via handle connection 416. Handle connection 416 can include threads or other mechanical fasteners, and as such can be removable and interchangeable with customized tap handles provided by breweries. For example, for systems designed to be used within the United States, the threads of the connection 416 can be 3/8"-16 UNC to comply with standard tap handles in the United States. The design of the connection 416 may vary by country. In some embodiments the handle 415 may be provided with a display or LED illumination in order to display branding information relating to the type of beer.

In FIG. 4A, the handle 415 is shown in a default or un-pulled position 401A. Pushing or pulling the handle can begin pouring, and pouring can either stop automatically based on instructions from the controller or can stop when the handle 415 is returned to the default position 401A. Some embodiments of the handle 415 may be biased towards the default position 401A such that it returns to the default position when not actively pushed, pulled, or otherwise held.

Although pulling (or pushing) the handle 415 begins pouring, the extent of opening of the variable opening valve 450 is controlled programmatically by the controller 445 as described herein. As such, the pull of the handle 415 can be sensed by the PCB 455 coupled to the handle 415 and a signal indicating that the handle has been pulled can be sent from the PCB 455 to the controller 445. Other suitable techniques for generating the signal indicating that the handle is pulled include mechanical, magnetic and/or electrical sensors, or receiving data from a gyroscope or accelerometer in or on the handle 415. In response to receiving this signal, the controller 445 can use the data from the sensors, predetermined instructions mapping the sensed parameter values to a specific flow rate, and a mapping between the flow rate and an extent of opening of the variable opening valve 450 in order to control the opening of the variable opening valve 450.

In some embodiments, returning the handle 415 to the default position and pushing the handle 415 backwards (e.g., away from the bartender) from the default position 401A can cause the PCB to send a signal to the controller 445 that causes the controller 445 to activate the creamer 440. Accordingly, there can be three actions taken by the controller 445 in response to sensing three different handle positions: closing the tap in the default position 401A, pouring liquid beer at a determined flow rate (or determined variable flow rate) in the pull position, and pouring cream in the push position. In other embodiments the creamer 440 may be activated automatically based on pre-specified instructions relating to liquid and foam beer quantities per glass. The determined flow rate can change during pouring, for example by having a low flow rate initially to prevent foaming when beer first hits the glass, increasing flow rate to a maximum determined rate that will not cause undesired foaming, and then decreasing flow rate again at the end of the pour when the glass is too full to tilt at an angle.

Further, the duration of opening the variable opening valve 450 is controlled programmatically by the controller 445, for example in response to user input provided via the dial 465 and on the determined volume of beer flowing through the tap 400. The dial 465 of the illustrated embodiment is a circular, rotatable wheel or knob positioned around the display 420 and including numerical and graphical representations of glass volume options. The bartender can rotate the dial 465 clockwise or counterclockwise to align one of the volume markings with a "select" position, thereby selecting the volume of the glass into which beer will be poured, and the controller 445 can determine a length of time for which the variable opening valve 450 should be opened based partly on the selected volume. The controller 445 can also factor in the determined flow rate (or variable flow rate) of the beer and the specified quantity of head that will also be poured into the glass in order to identify the desired duration of opening the variable opening valve 450.

In addition to the rotatable serving volume selection functionality, the dial 465 can be rotated and/or pushed to scroll through device settings menu options and other user interfaces presented on the display 420. Although shown as a rotatable, circular dial with a number of volume markings, it will be appreciated that other volume selection inputs can be used instead of or in addition to the illustrated dial 465. Examples include dials of other form factors, mechanical or touchscreen buttons each corresponding to one a number of predetermined volume options, a switch that flips between various predetermined volume options, and the like. In some examples, the display 420 may be touch sensitive and the bartender can select or input the desired volume by touching selectable user interface options presented on the display 420. In some embodiments, the display 420 may not be touch sensitive, and the bartender can select from volume options presented on the display by rotating the dial 465.

The display 420 is positioned on a user-facing surface 425 of an exterior surface 406 of the housing 405 as shown in FIG. 4A, with the user-facing surface 425 being the surface of the housing 405 that faces the bartender as he or she pulls the handle 415. The display 420 can be configured to display sensed beer parameters, maintenance reminders, and alerts relating to sensed problems within the draft beer system. The display 420 can thus be used to provide actual time alerts and information about the draft beer system including cooling, keg fullness, keg freshness, gas pressure, and beer quality. Advantageously, providing the display 420 in the illustrated location enables the bartender to quickly ascertain displayed beer parameters (e.g., temperature, pressure, keg fill level) when approaching the tap and/or dispensing beer. The display 420 can be a digital display screen, for example a liquid crystal display or light-emitting diode display, and can be water proof or water-resistant. The display electronics 460 can include pixels for representing points in various colors on the display and associated circuitry for controlling the color of the pixels.

As illustrated, the power supply 490 includes an adapter (shown with the label 490) that provides input power to the tap 400 via cable 491, for example DC or AC power. The power supply 490 also includes an output power cable 492 that can be used for series power connection between multiple taps, such that a single adapter can be used to provide power to multiple adjacent smart taps 400. The adapter can be a wall mount adapter for coupling to an external power source (e.g., a main power supply of the bar or other venue using the tap 400). The power supply 490 can be a battery in some embodiments, for example a replaceable or rechargeable battery, and can be included within the housing 405.

The tap spout 430 delivers beer into the glass during pouring, and can be designed to pour the beer without creating any (or any significant) turbulent flow. Further, the spout 430 does not require foam purging after pouring foam in some embodiments.

The maintenance mode switch 495 can be a hidden switch (e.g., not easily visible to consumers in the area of the tap 400) that puts the tap 400 into a maintenance mode. This can be done for example during line cleaning. Data regarding the timing of pushing the maintenance mode switch 495 can be used to determine maintenance alerts as described herein.

In the illustrated smart tap 400, the depicted sensors 485, display 420, tap spout 430, coupling 410, creamer 440, variable opening valve 450 and associated actuator 480, controller 445, printed circuit board (PCB) 455, port 447, and display electronics 460 are provided within or as part of the housing 405. User controls (dial 465, maintenance mode switch 495, and handle 415) are provided on the exterior of the housing 405. The housing 405 can be manufactured from suitable materials including metals, plastics, and wood, and can be manufactured from a single piece of material or from multiple joined materials. One example of the housing 405 can be around four inches long (e.g., extending along its longitudinal axis) and have a diameter of two to four inches. In some embodiments the housing 405 can form a sealed chamber around the fluid path 470 in order to protect the interior electronics (controller 445, printed circuit board (PCB) 455, and display electronics 460) from exposure to moisture (e.g., beer spills).

Figure 5A:
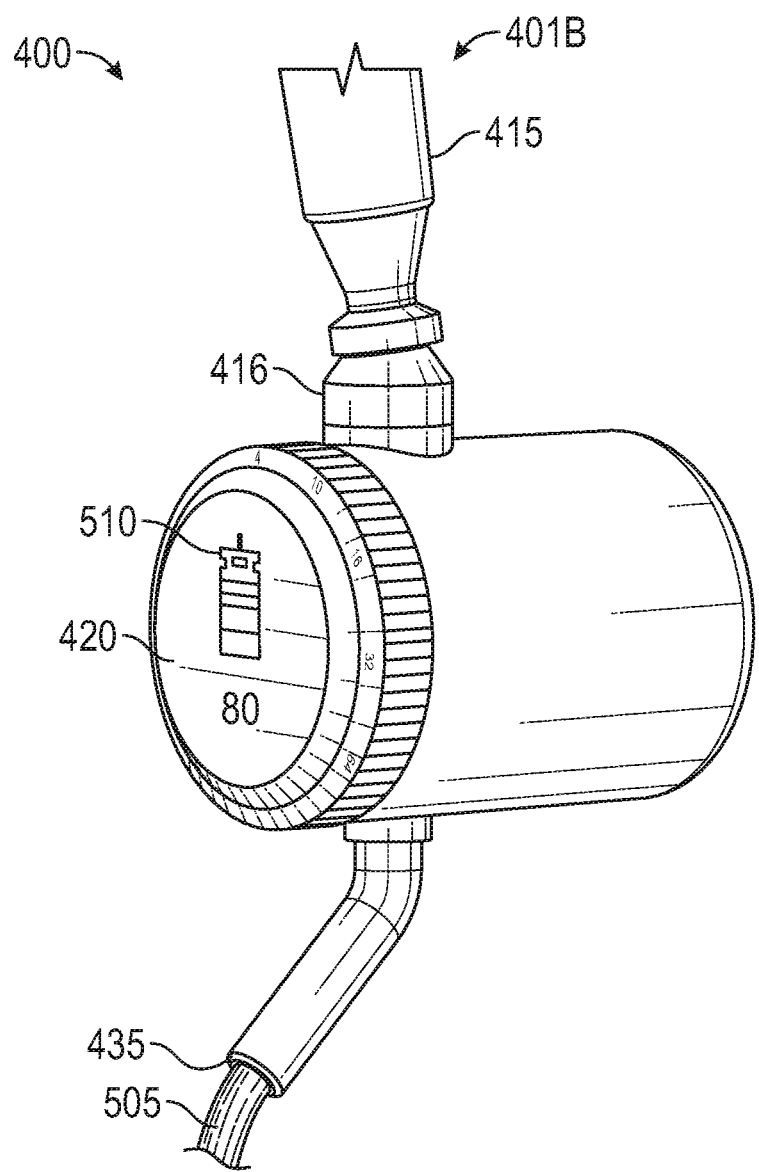
FIG. 5A depicts the smart tap of FIGS. 4A and 4B during pouring.

FIG. 5A depicts the smart tap of FIGS. 4A and 4B during pouring. As shown in FIG. 5A, the handle 415 is poured forward toward the user in an activated position 401B. As described above, a simple pull into the activated position 401B can trigger an automated pouring process that pours a specified volume of liquid beer 505 and head with dynamically varied flow rate parameters calculated based on sensor data. In other examples a pull into the activated position 401B can be used in a manual mode to manually control the volume of beer dispensed, with pouring still automated relating to the variable flow rate. In manual mode, pushing the handle 415 backward beyond the default position 401A can activate the creamer to add a manually-controlled volume of head to the glass of beer.

Figure 5B:
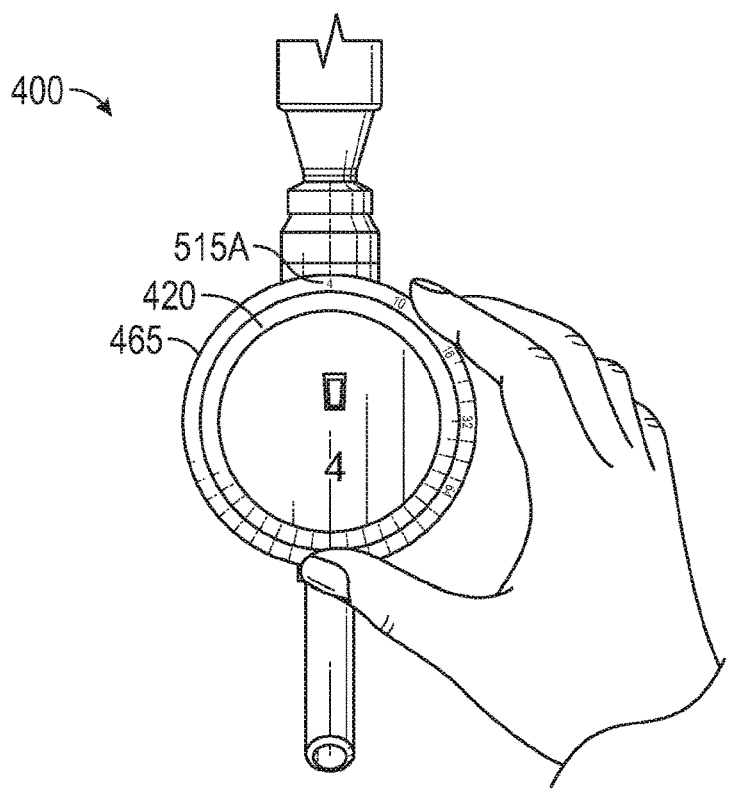
FIGS. 5B and 5C depict user interaction with the dial of the smart tap of FIGS. 4A and 4B.
Figure 5C:
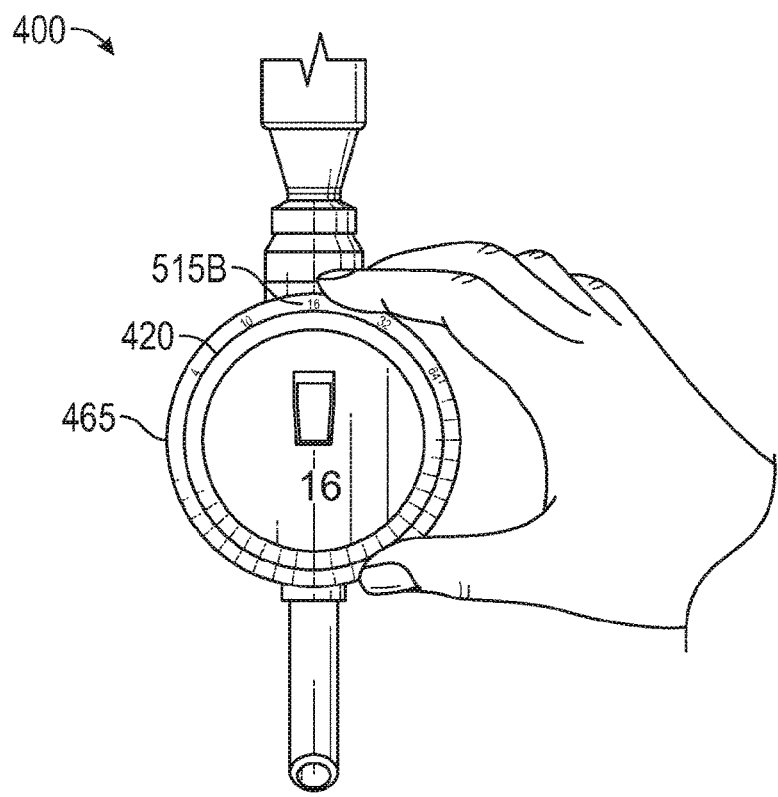

FIGS. 5B and 5C depict user interaction with the dial of the smart tap of FIGS. 4A and 4B. FIG. 5B depicts a first volume selection 515A corresponding to a four ounce glass. The display 420 accordingly depicts a graphical icon of a small glass of beer. FIG. 5C depicts a second volume selection 515B based on rotation of the dial 465 with the second volume selection 515B corresponding to a sixteen ounce glass. The display 420 accordingly depicts a graphical icon of a larger glass of beer, and the size and fill level of the depicted graphical icon can be dynamically varied based on selected pouring parameters.

Figure 6:
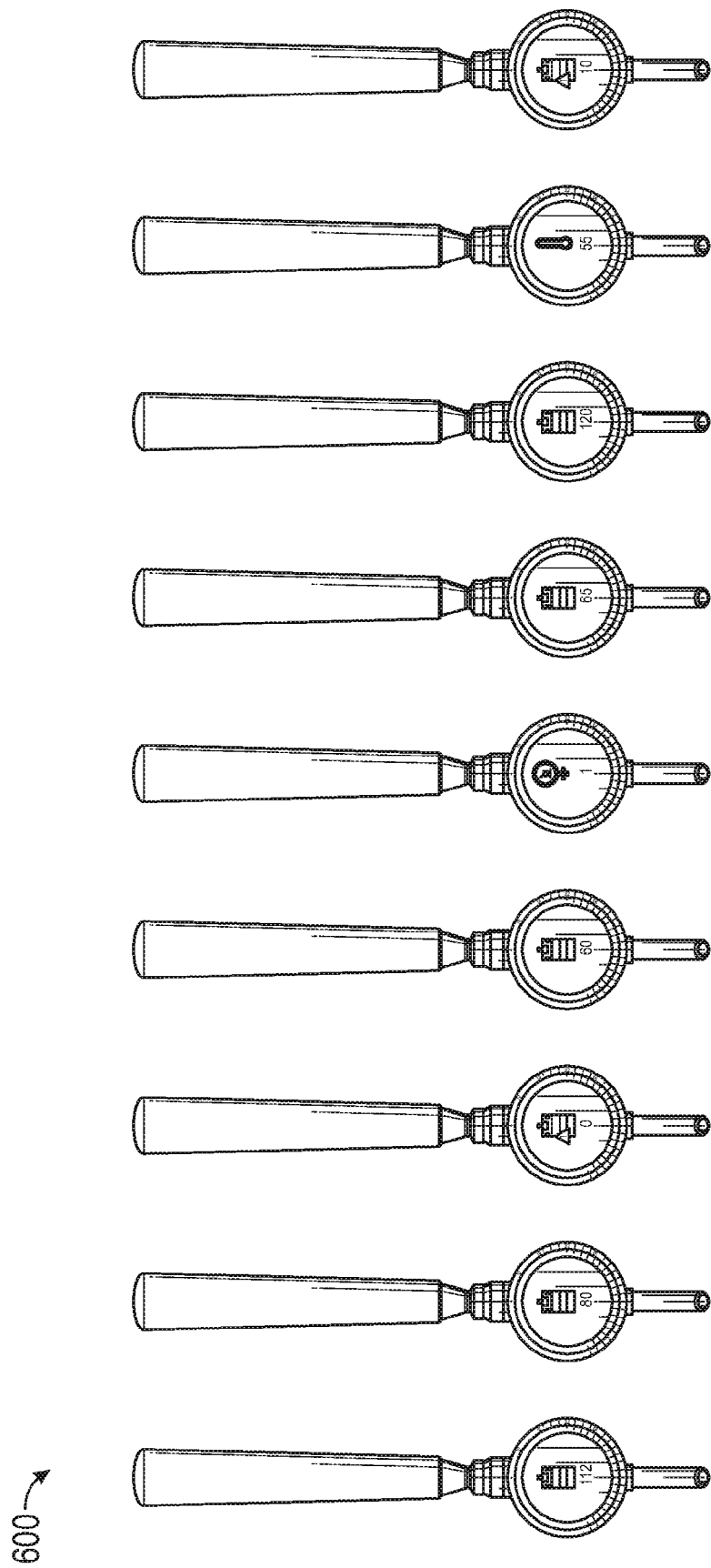
FIG. 6 depicts example graphical user interfaces that can be presented on the display of a smart tap as described herein.

FIG. 6 depicts example graphical user interfaces that can be presented on the display of a smart tap as described herein. The smart tap 9, 325, 400 can detect low pressure, high pressure, keg empty, foaming, high temperature, low temperature, freshness, low beer in keg, and other situations relating to the draft beer system based on the data from the sensors. The display 420 can be used to provide real time alerts and notifications about the beer service conditions to the tap user.

From left to right, the example displays shown in FIG. 6 depict a 112 pints left display, 80 pints left display, 0 pints left display, 60 pints left display, 1 psi pressure indicator, 65 pints left display, 120 pints left display, 55 degrees Fahrenheit temperature indicator, and ten pints left display. As illustrated, the level of fill depicted for the graphical keg icon can vary based on the determined number of pints left. Additional graphics such as alert icons can overlay the display when certain situations occur.

Low pressure and high pressure conditions are detected with the feedback taken from pressure sensor and flow rate and shown to users with the related icons.

A keg empty situation is detected based on the data acquired from the flow sensor in real time. Keg empty situations prompt a warning to a user with a specific icon.

Foam has a specific color depending on the style of the beer and foaming can be detected by the color sensor of the smart tap. Additionally, foaming occurs when beer is warmer than a certain degree depending on the style of the beer, how much time has passed since the last pour, and freshness of the keg. Detecting these parameters can be used to identify foam-creating conditions and warn users about the upcoming foam with an icon.

Each style of beer may have different recommended service temperature. An internal thermistor sensor is used to provide accurate information about the service temperature of the beer. Low and high temperature thresholds can be set for various sensed temperatures throughout the draft beer system, and in some examples these thresholds can be specifically tailored to the particular setup of a draft beer system. If a sensed temperature is outside of the specified thresholds, users see the related warning icon.

Freshness of the beer is calculated depending on the style of beer used, and can also be based on sensed parameters from the various sensors described herein. Freshness of the beer is indicated to user with a specific icon.

The remaining quantity of beer left in a in keg is reset after a new keg is detected. The user sets the keg size during the installation. Amount left is calculated based for example on data from the flow meter or other sensed parameters as described herein. The user is warned about low beer in keg situations with a specific icon.

Figure 7:
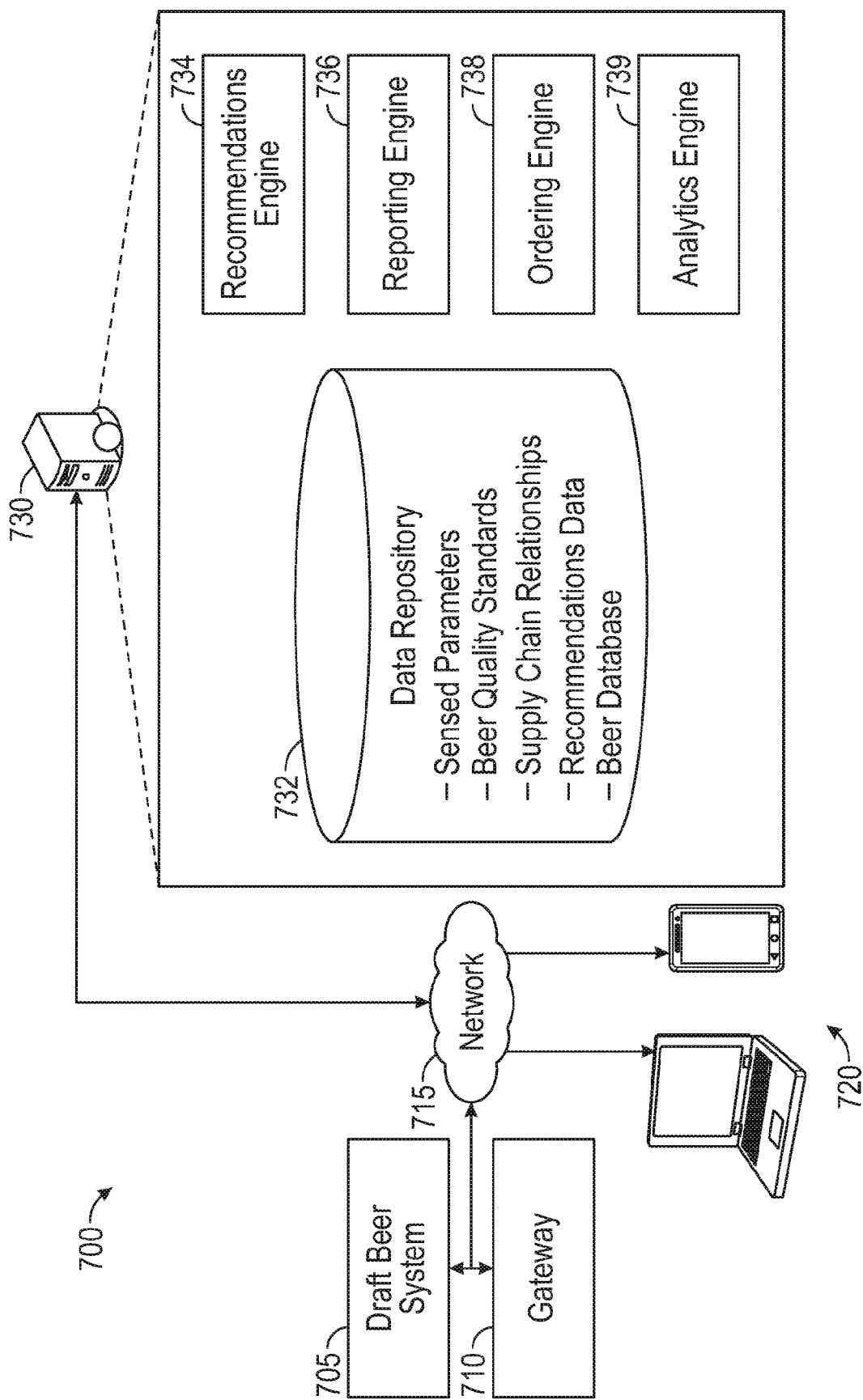
FIG. 7 depicts a schematic block diagram of a network environment including a smart tap as described herein.

FIG. 7 depicts a schematic block diagram of a network environment 700 for operating a smart tap as described herein. The network environment 700 includes draft beer system 705, which can be the draft beer system 300 including smart tap 325 described above, or another draft beer system including smart tap 400. The network environment 700 also includes gateway 710, network 715, remote server 730, and user devices 720.

Gateway 710 includes a local network connection module (e.g., Bluetooth or other wireless or wired local area connection) that enables the gateway 710 to send data to and receive data from smart taps 325, 400 in a local region surrounding the gateway 710 (e.g. a bar or other draft beer venue). The local network connection module can also enable the gateway 710 to send data to and receive data from user devices 720 within the local region. For example, gateway 710 can send sensed parameters to an application running on the mobile device of a bartender within the local region. Gateway 710 also includes a wide area connection module (e.g. a cellular modem or wired Internet connection) that enables the gateway 710 to communicate over the network 715 with the remote server 730, and optionally with the user devices 720. Gateway 710 can further include a data repository for storing historical draft beer pouring data including a history of sensed parameters and the flow conditions of various taps that were used to dispense particular beers. Thus, the gateway 710 may also store historical draft beer pouring data in an internal memory that can be recalled, for example, by USB connection, network connection (wired or wireless), cell phone connection, near field communication, Bluetooth connection, and the like. The historical draft beer pouring data can also periodically be automatically be logged into the data repository 532 of the remote server 730 and/or sent to a user device 720 via network 715.

The gateway 710 can be a device installed in the draft beer system 705 or in the environment of the draft beer system 705. In embodiments in which the disclosed smart taps include wide area connectivity capabilities, for example by each having a cellular modem, the gateway 710 may be not be a separate device, but rather the functionality of the gateway can be distributed among various taps in the draft beer system 705.

The network 715 can include any appropriate network, including an intranet, the Internet, a cellular network, a local area network or any other such network or combination thereof. User devices 702 can include any network-equipped computing device, for example desktop computers, laptops, smartphones, tablets, e-readers, gaming consoles, and the like. Users can access the interactive system 700 and view draft beer data via the network 715 and can be provided with recommendations via the network 715.

Remote server 730 includes one or more electronic hardware processors and one or more memories for storing computer-readable instructions and the described data. The memory can include data repository 732 (e.g., a database), and the recommendations engine 734 and reporting engine 736 can be implemented by the processor(s) executing the computer-readable instructions to process data stored in the data repository 532. Remote server 730 can be remote from some or all of the draft beer system 705, gateway 710, and user devices 720.

As illustrated, the data repository 732 is configured to store sensed parameters (e.g., temperature, pressure, color, flow rate, and the like), beer pouring quality standards and thresholds, supply chain relationships (e.g. which bars serve the beer of specific breweries), and recommendations data including bar-to-brewery and brewery-to-bar recommendations. The beer pouring quality standards can be configurable by breweries and include specified temperatures, pressures, head quantities, and associated thresholds for pouring glasses of beer. The data repository 732 can also store a centralized beer database in order to provide updates to smart taps as described above with respect to FIG. 3B. The centralized beer database can also store recently used beers of a bar and send data regarding these beers to the smart taps in that bar so that the bar staff can change the beer in the tap with the dial without requiring updates to be sent over a network. If beer is not in the list, the bar staff can create a new beer entry by selecting the style, keg size, price, brewery, and the like. The centralized beer database can add a beer to the database after multiple of the same entry are added to the system by different bars, and can use fuzzy logic in this updating process to prevent the same beer from being more than once because of user typos or other entry errors.

The recommendations engine 734 can compare sensed parameters of beers poured at various bars and other venues implementing the disclosed smart taps to brewery-specified pouring standards. These comparisons can be used to identify bars that do or do not comply with brewery pouring standards and to generate recommendations accordingly for presentation to breweries. The reporting engine 736 can handle the reporting of various alerts, data, and recommendations to specific users. The remote server 730 can also include an ordering engine 738 that enables bars to replenish inventory manually, view and place orders for recommended beers, and authorize automatic orders (for example by subscribing to a particular beer delivery at a particular frequency or when that beer reaches a specified low level in its keg). The remote server 730 can also include an analytics engine 739 that analyzes aggregate subsets of sensed parameter data (for example flow volume) in order to identify sales performance of various beers and breweries, for example compared to other brands, in different regions, and/or at different bars or types of bars.

In some embodiments, data indicating consumer satisfaction with the beer poured by the disclosed smart taps can be provided to the remote server 730, and the remote server 730 may refine the specified pouring conditions (e.g. temperature, head volume) for styles of beer or particular beers based on the data indicating consumer satisfaction. As such, the user devices 720 may belong to consumers who order and consumer beer at the draft beer system 705, and such devices 720 can be configured to run an application that solicits user feedback and provides this feedback to the remote server 730 via network 715.

Figure 8A:
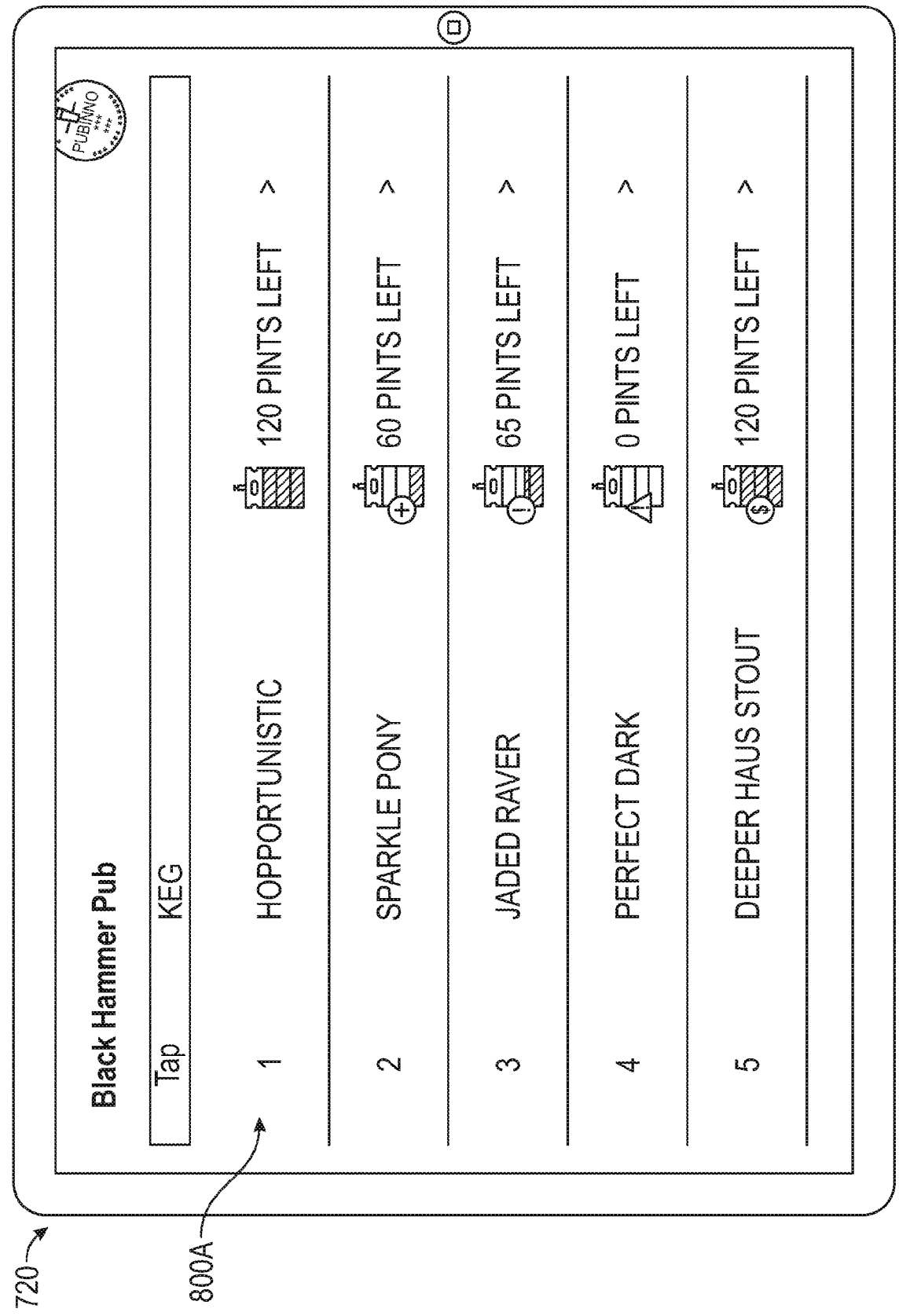
FIGS. 8A-8C depict example user interfaces that can be presented to bars via the network environment of FIG. 7.
Figure 8B:
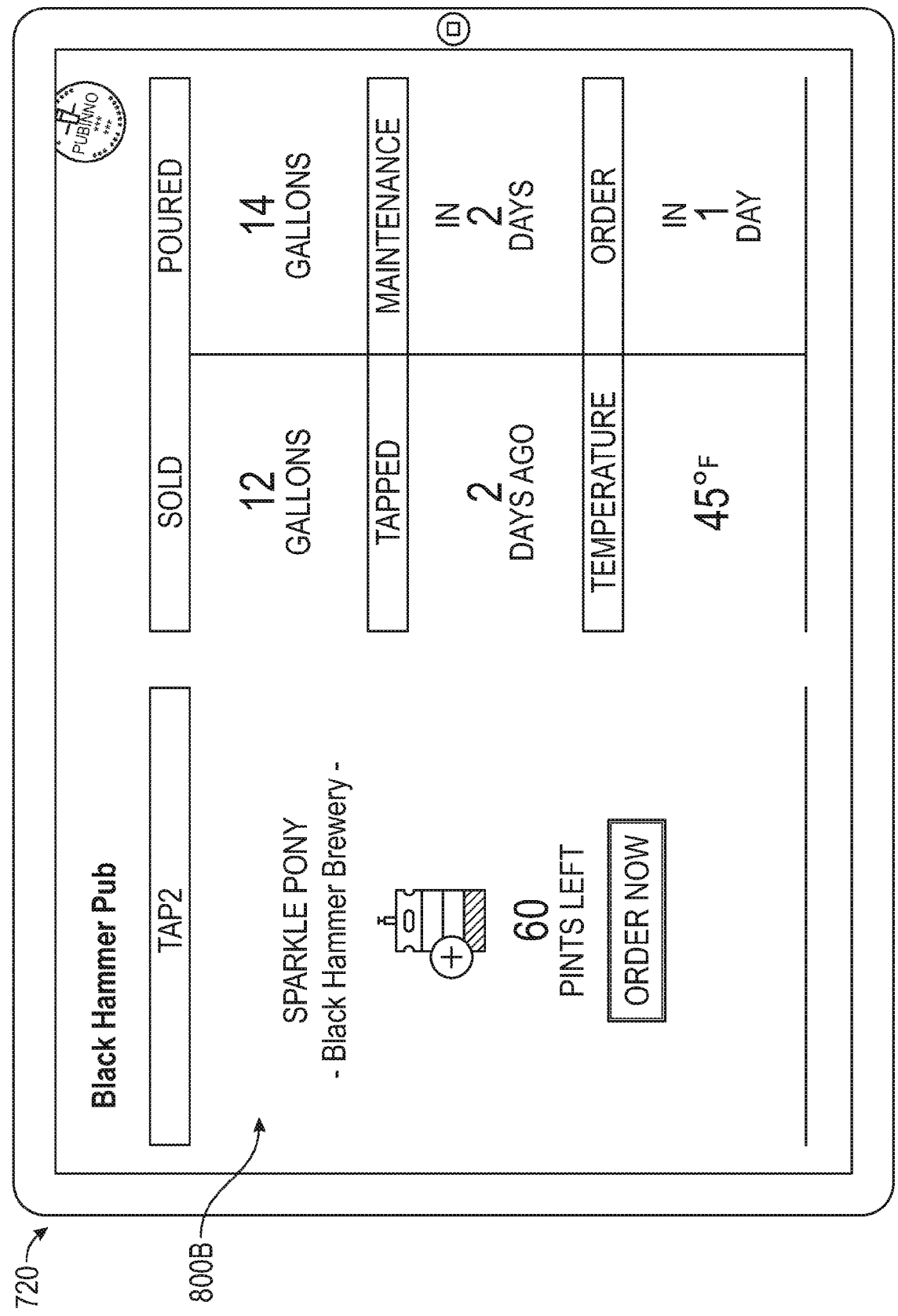
Figure 8C:
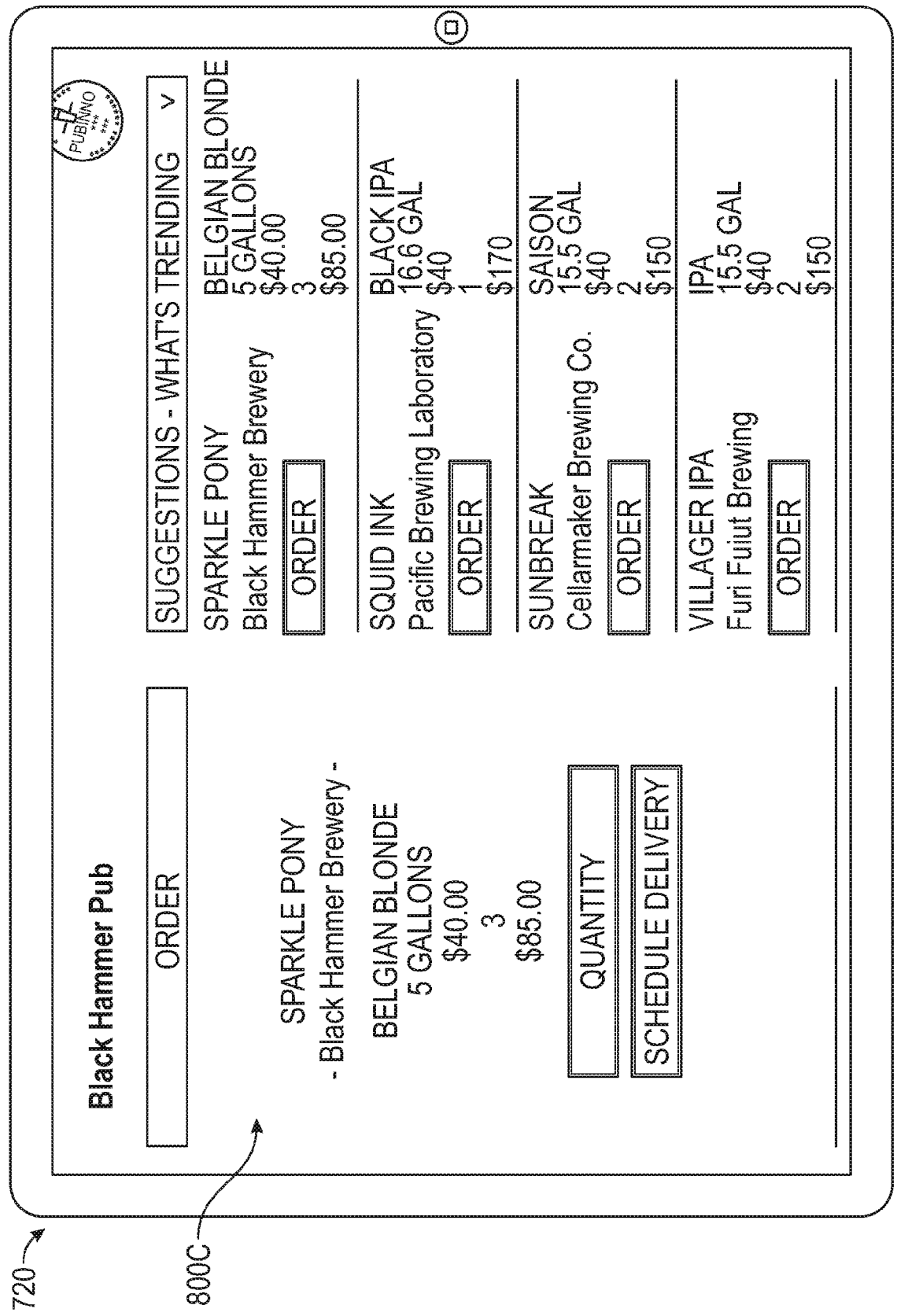

FIGS. 8A-8C depict example user interfaces that can be presented to bars on a user device 720 via the network environment of FIG. 7. FIG. 8A depicts a first example user interface 800A that presents keg status information for a number of different beers served at the Black Hammer Pub. The keg status information can be determined based on sensor data received from smart taps. FIG. 8B depicts a second example user interface 800B that presents additional information relating to pouring of the Sparkle Pony beer at the Black Hammer Pub, including how many gallons have been sold versus how many gallons have been poured, when the keg was last tapped, when the next maintenance is due, the temperature of the Sparkle Pony keg, and a recommendation regarding when to order more Sparkle Pony beer. The displayed information can be determined based on sensor data received from smart taps. Beneficially, displaying the quantity sold versus the quantity poured can assist bar managers in identifying fraud. Another example user interface can present a more detailed breakdown of the sold versus poured information, for example based on date and time and also including information regarding bar staffing during such times. Another example can present a data analytic result from the system 700 that identifies, based on the historical pouring data, which bar staff has the biggest or smallest difference between sold and poured beer, which bar staff have a difference exceeding a bar-specified threshold, and/or a ranking of bar staff based on difference between sold and poured beer during that staff's shift.

FIG. 8C depicts another example user interface 800C that provides recommendations to the bar manager regarding which beers to order. As illustrated, the recommended beers can be based on what is trending, as determined based on data acquired from the smart taps from a number of different bars. For example, a trending beer may be a beer that has a highest (or high) ranking when beers within a certain region are ranked based on poured volume within a recent window of time. Such recommendations can be geographically-specific based on what consumers are being poured in a region around the bar, and can reflect seasonal trends by basing the recommendation on data acquired during a specific time window. The user interface 800C also includes pricing information and user-selectable features that allow the bar manager to place an order for a desired beer directly from the interface. Beneficially, this saves time and allows bar managers to identify desired beers and place orders in an efficient manner from a single interface.

For example, a bar owner or manager can be presented with the user interfaces of FIGS. 8A-8C daily, weekly, monthly, or at other specified periods to see sales information, maintenance information, and notifications of any detected fraud. Certain notifications may be provided in real time, for example sensor data that indicates a particular beer keg is suffering from temperature or pressure problems, beneficially enabling the bar to prevent serving any potentially spoiled inventory. Beneficially, the data and recommendations provided via the user interfaces of FIGS. 8A-8C enable bar owners to identify what are the "right" beers to serve to their customers to increase profitability.

Figure 9B:
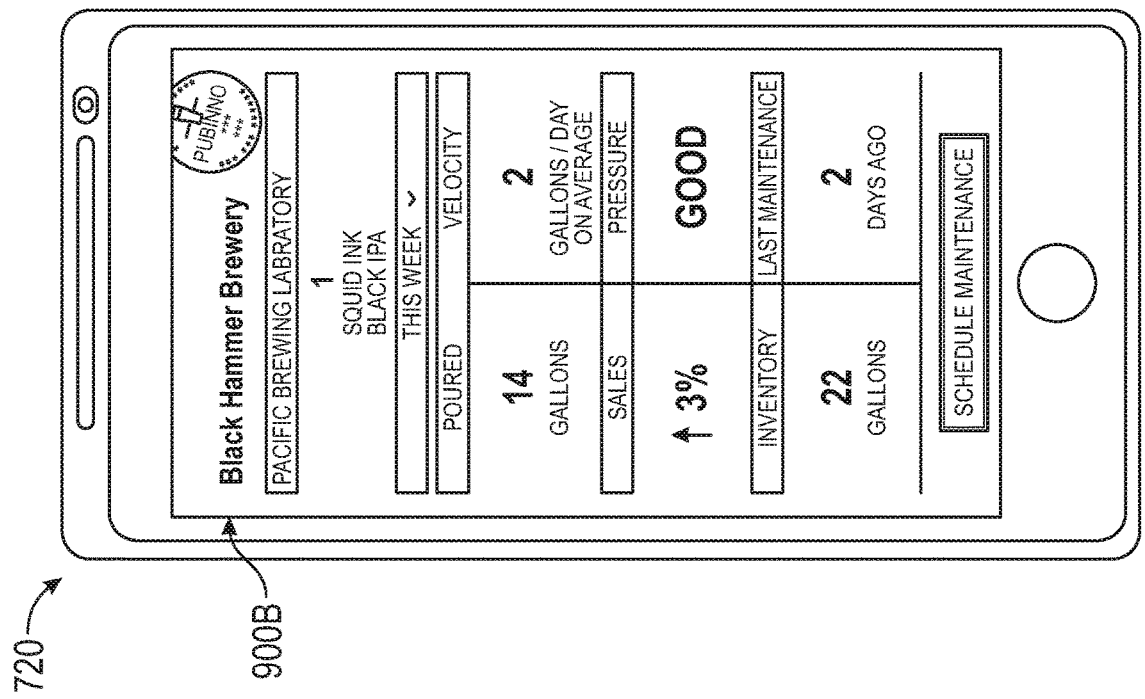
FIGS. 9A and 9B depict example user interfaces that can be presented to breweries via the network environment of FIG. 7.
Figure 9A:
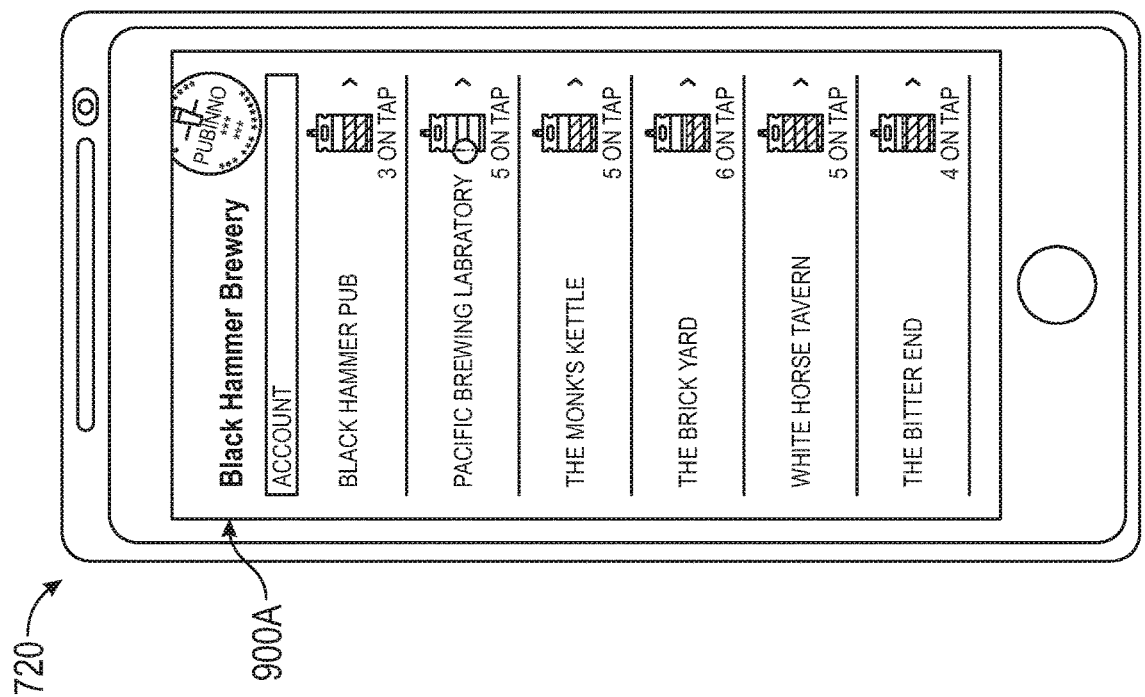

FIGS. 9A and 9B depict example user interfaces that can be presented to breweries via the network environment 700 of FIG. 7. FIG. 9A depicts an example user interface 900A including a listing of accounts with Black Hammer Brewery together with graphical and textual depictions of how many kegs are left on tap of specific types of beer. Selecting one of the accounts may lead the user to the interface 900B shown in FIG. 9B.

FIG. 9B depicts an example user interface 900B including this week's pouring conditions for Black Hammer Brewery's Squid Ink Black IPA at the Pacific Brewing Laboratory. The user interface can include a selectable menu to change "this week" to another desired timeframe, and can update the displayed pouring conditions accordingly based on analysis of sensor data received from a smart tap at Pacific Brewing Laboratory that poured Squid Ink Black IPA during the timeframe. As illustrated, the displayed conditions include the gallons poured, velocity of the gallons poured (e.g., gallons per day), rate of change in sales, a pressure quality indication, inventory amount, and last maintenance information. This display can be based on data received from smart taps. The user interface 900B further includes a user-selectable option for the brewery to schedule maintenance at Black Hammer Brewery.

For example, a brewery owner or manager can be presented with the user interfaces of FIGS. 9A and 9B daily, weekly, monthly, or at other specified periods to see sales reports, quality data representing bar pouring compliance with their pouring quality standards, and storage conditions relating to their beer that is being served at bars. Breweries can also be presented with an interface similar to FIG. 9B to track the performance of a beer, for example a new beer during a promotional pour. Certain notifications may be provided in real time, for example sensor data that indicates a particular beer keg from the brewery is suffering from temperature or pressure problems, beneficially enabling the brewery to reach out to a bar to prevent serving any potentially spoiled inventory. Breweries can also be alerted of poor service conditions relating to their beer, for example when a keg is tapped for too long, maintenance is not performed adequately, and/or temperature or pressure problems are detected with the beer. This can allow the brewery to follow up with these issues with a maintenance team. Beneficially, the data and recommendations provided via the user interfaces of FIGS. 9A and 9B can assist breweries in determining how to brew the right style of beer, simplify inventory, sell to the right audience, and to know how their brewery is doing compared to others.

Though not illustrated, another user interface that the network environment 700 can provide to breweries allows the breweries to specify the pouring conditions for the beer(s) that satisfy their pouring quality standards. In one example, the interface can allow the brewery to specify the quantity of head and the type of head (e.g., size of foam bubbles). In other examples the interface can allow the brewery to specify other pouring conditions, for example temperature and pressure. Another user interface can allow breweries to monitor bar compliance with these pouring quality standards. Another user interface can provide recommendations to breweries based on comparison of received smart tap and/or draft beer system sensor data, where such recommendations positively recommend bars that are in compliance with their pouring standards and negatively recommend bars that are out of compliance with the pouring standards. These recommendations can be generated and provided for bars that currently pour the brewery's beer, as well as for bars that are pouring other breweries' beers.

Overview of Example Flow Control Techniques

The smart tap 9, 325, 400 provides automated pouring with portion control based on sensed parameters, and/or stored information associated with the beer being poured, for example, as described above. Portions (e.g., volume of liquid dispensed per glass) may be set via device menu using the dial 465, a mobile application, or a web-based application by the user. As described above, the tap handle 415 can be used to start pouring by the user pulling the handle. The tap 9, 325, 400 pours the set amount of liquid beer and beer head and can then stop pouring automatically. If the tap handle is pulled more than once, the tap 9, 325, 400 will add another beer of the selected amount to the service queue. Prior to pouring, the tap 9, 325, 400 can determine whether the amount of beer exposed to air on top of the tap should be poured before filling a next glass due to oxidation.

In some embodiments, pouring starts with the lowest possible flow rate no matter what the sensor readings are to eliminate foaming that occurs when beer initially hits the glass. Similarly, in some embodiments pouring ends with the lowest possible flow rate to eliminate foaming that may occur, because the glass once full will not be tilted 45 degrees.

Flow control setup can involve of a test program where style of beer, freshness of the keg, length of the beer line and cooling system type are input by a test engineer. Temperature of the beer, ambient temperature, pressure of the beer and atmospheric pressure are measured via sensors on the external test setup. Time between pours and beer left in keg is calculated by the test program. Test setup also includes of a flow meter that logs tested flow rates and amounts in each stages of the pour.

The user inputs what flow rates and amounts will be used during the pour to the external test program. The test setup pours the beer and all sensor data is collected during the pour. The user measures the amount of foam that resulted from the pour and rates the foam, for example on a scale between 0-5 to the pouring where 0 is the highest foam and 5 is the minimal. All of this test data is saved and transferred to a modeling tool. Flow rates and amounts for different pouring stages are calculated based on inputting the measured test conditions and resultant foam into the modeling tool. The modeling tool provides a formula to use as the flow control, for example in the process 1000 described below.

Figure 10:
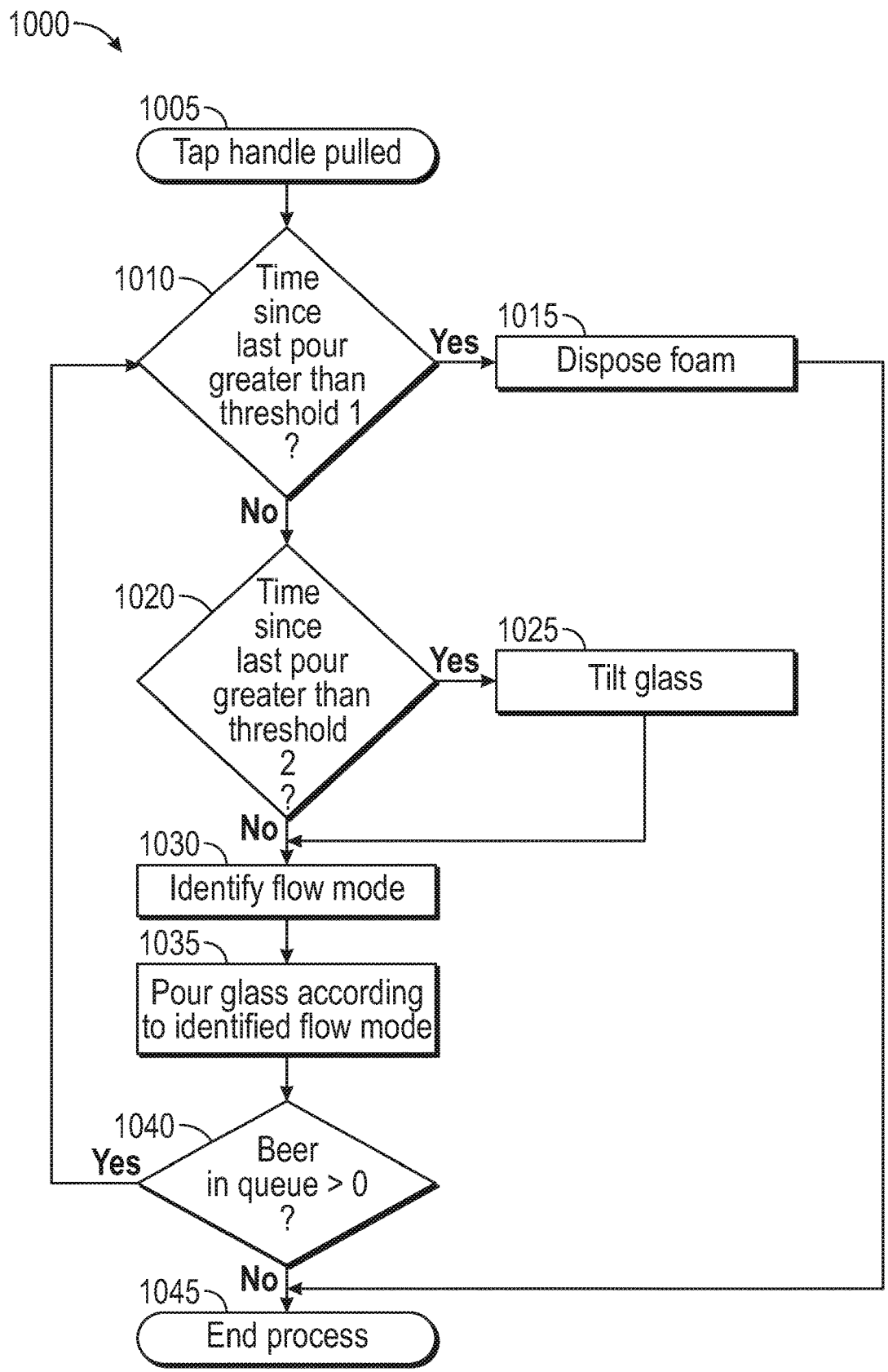
FIG. 10 depicts a flowchart of an example flow control process that can be implemented by the smart taps described herein.

FIG. 10 depicts a flowchart of an example flow control process that can be implemented by the smart taps 9, 325, 400 described herein. At block 1005 the controller of the tap 9, 325, 400 determines that beer ordering or pouring has been initiated. For example, this can be triggered by the power on of the system, the bartender selecting a volume via the dial, or the bartender pulling the tap handle as illustrated in block 1005.

At block 1010 the controller of the tap 9, 325, 400 determines whether the time since the last pour is greater than a first threshold, for example three hours. If so, the process 1000 transitions to block 1015 to flush any foam from the tap and/or beer line and the process ends. At this point the user can choose to re-initiate pouring, and the time since the last pour can be calculated based on the time of such foam flushing.

If not, then the process 1000 transitions to block 1020 to determine whether the time since the last pour is greater than a second threshold that is smaller than the first threshold, for example ten minutes. If so, the tap can display a tilt glass screen at block 1025 to guide the bartender in correct glass placement given the time since the last pour, and then proceed to block 1030.

If the time since the last pour is not greater than the second threshold, then the process 1000 transitions to block 1030. At block 1030 the controller of the tap 9, 325, 400 determines what flow mode to use.

Example flow modes include a slow filling mode, normal filling mode, and fast filling mode. In slow filling mode, the tap 9, 325, 400 can begin filling with the minimum flow velocity and then fill the remaining volume with a low flow rate identified based on sensed parameters and input data.

In normal filling mode, the filling process can be performed in three stages. In the first stage, the glass is filled up to a first predetermined volume using the minimum flow velocity. In the second stage the flow rate can be calculated as function of time since beginning of pour and temperature. In the third stage the flow rate can be calculated as a function of flow rate and temperature and can gradually step down until the glass is full.

In fast filling mode, the filling process can be performed in two stages. In the first stage, the glass is filled up to a first predetermined volume using a velocity higher than the minimum velocity. In the second stage the flow rate can be calculated as a function of time since pour and flow rate. In fast filling mode the flow rate can also gradually step down towards the end of the pour.

Other filling modes may be beer-specific and include pouring conditions set by bars and/or breweries. Flow rate determination can be performed in some embodiments based on linear error feedback loop that determines how to actuate the valve actuator.

As another example, in a volume mode a pouring loop can determine whether the poured volume is greater than the expected (e.g., user-set) volume based on flow meter sensor data. If not, the tap 9, 325, 400 can determine whether the controller 445 has received a stop pouring indication. The stop pouring indication can be provided by a user, for example when a stop button is pressed, when a tap handle is in a default position (like position 401A described above), when a user pushes a tap handle backward to indicate a stop pouring command, or can be automatically generated in response to pre-specified automated pouring conditions. If the controller 445 has not received a stop pouring indication, the tap 9, 325, 400 can continue with the pouring loop. If the stop pouring indication is received or the poured volume exceeds the expected volume, the tap 9, 325, 400 can stop pouring. As another example, in a time mode the pouring loop can determine whether the pouring time is greater than the expected time. If not, the tap 9, 325, 400 can determine whether a stop pouring indication is received, and if not can continue with the pouring loop. If the stop pouring indication is received or the poured time exceeds the expected time, the tap 9, 325, 400 can stop pouring. These pouring modes can be performed during and together with the slow, normal, and fast filling modes described above.

At block 1035, the tap 9, 325, 400 pours the beer according to the identified flow mode. Flow rates and amounts poured at block 1035 are calculated in real time with the data collected from the sensors or data provided to the smart tap 9, 325, 400. Such data can include one or more of temperature of the beer, ambient temperature, pressure of the beer, atmospheric pressure, length of the beer line, cooling system type used (cooling rooms, kegerator or flash chillers), style of the beer, beer left in the keg, time between pours, sensed color of liquid flowing through the tap, and freshness of the keg. The flow control mode takes into account these parameters to create optimal flow characteristics over every pouring to minimize the amount of foam that occurs while providing the maximum possible flow rate in order to protect both service speed and beer quality. Further, the flow control mode can identify a desired quantity of head and can activate the creamer accordingly if operated in auto-foam mode.

After pouring the controller of the tap 9, 325, 400 can determine based on sensor data whether the keg is empty, the tap is dirty, $CO_2$ is low, whether any keg alarm should be activated, and whether the service (e.g., maintenance needed) menu should be activated. If so, the controller of the tap 9, 325, 400 can present an appropriate display screen to guide user action regarding cleaning the tap, connecting the beer line to a different keg, maintenance, or other recommended corrective action. The controller of the tap 9, 325, 400 can also update the amount left in keg and any associated graphical display on the display.

At block 1040, after the pouring is complete the controller of the tap 9, 325, 400 determines whether any beer remains in the queue. If not, the process 1000 moves to block 1045 and ends. If so, the process 1000 loops back to block 1010, and optionally can display an indication that it is preparing the next beer.

Automated pour according to the process 1000 can provide a minimum amount of unwanted foam occurrence while optimizing the beer flow speed, and additionally provides a desired amount of intentionally-created creamy foam. The tap 9, 325, 400 has the ability via the creamer 440 to pour a dense, creamy foam, which is a special type of foam where bubble sizes are typically in the order of micrometers. As described above, the creamer function can be activated either by pushing the handle backwards or via an automatic creamer control that pours creamy foam after the amount of beer poured reaches pre-set amount.

Implementing Systems and Terminology

Implementations disclosed herein provide systems, methods and apparatus for smart beer taps configured for automated dispensing of desired beer and head quantities per glass based on beer characteristics and sensed parameters, as well as for connected draft beer systems for monitoring draft beer pouring conditions.

The beer dispensing, data management, and recommendations functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A fluid dispensing tap comprising:
    a housing having a fluid path extending therethrough from an input aperture to an output aperture in a spout of the tap;
    a display positioned on a user-facing surface of the housing;
    at least one sensor positioned along the fluid path and configured to generate parameter data representing a parameter of fluid flowing along the fluid path based on real-time sensing of the parameter;
    a variable opening valve positioned along the fluid path and configured to define a variable area across the fluid path;
    an actuator configured to open and close the variable opening valve;
    a creamer positioned along the fluid path and configured to agitate the fluid and to cause the fluid to transform from a liquid into a foam;
    a handle coupled to an exterior of the housing;
    a position sensor configured to generate position data representing whether the handle is in any of a first or second position; and
    a controller configured to:
        receive the parameter data from the at least one sensor;
        based at least partly on the parameter data, determine an extent to which to open or close the variable opening valve;
        control the actuator to open or close the variable opening valve to the determined extent;
        in response to receiving a creamer activation signal, activate the creamer to agitate the fluid;
        generate an output for presentation on the display based at least partly on the parameter data;
        in response to receiving position data indicating that the handle is in the first position, close the variable opening valve to stop flow of the fluid along the fluid path; and
        in response to receiving position data indicating that the handle is in the second position, control the actuator to open or close the variable opening valve to the determined extent.

2. The fluid dispensing tap of claim 1, wherein the fluid comprises beer, and wherein the controller is configured to at least one of:
    output alerts or status indicators on the display based on the parameter data; and determine the extent to which to open or close the variable opening valve based at least partly on a type of the beer.

3. The fluid dispensing tap of claim 1, wherein the at least one sensor comprises at least one of:
    a pressure sensor,
    a temperature sensor,
    a flow meter; and
    a color sensor configured to detect a color of the fluid.

4. A networked draft beer system comprising the fluid dispensing tap of claim 1, the fluid dispensing tap comprising a smart tap configured for pouring a beer, the smart tap including:
    a network connectivity module configured to transmit the parameter data over a network;
    a server remote from the smart tap and including:
        a module configured to connect the server to the network to receive the parameter data;

a data repository configured to store the parameter data and data representing draft beer pouring quality standards associated with the beer;

an analytics engine configured to analyze the parameter data to determine compliance with the draft beer pouring quality standards; and a recommendations engine configured to:
generate a recommendation based on the analytics engine analyzing the data, the recommendation representing whether a venue of the smart tap complied with the draft beer pouring quality standards; and
cause output of the recommendation to a brewery that brews the beer.

5. The networked draft beer system of claim 4, wherein the draft beer pouring standards include at least one of:
a specified temperature for serving the beer, wherein the at least one sensor comprises a thermistor configured to sense temperatures of the beer flowing through the housing, and wherein the analytics engine is configured to determine whether the sensed temperatures correspond to the specified temperature;
a specified pressure for serving the beer, wherein the at least one sensor comprises a pressure sensor configured to sense pressures of the beer flowing through the housing, and wherein the analytics engine is configured to determine whether the sensed pressures correspond to the specified pressure;
a specified quantity of head per glass of the beer, and wherein the analytics engine is configured to determine whether, for each glass of the beer poured through the smart tap, that the glass was provided with the specified quantity of head; and
a freshness of a keg containing the beer.

6. The networked draft beer system of claim 4, comprising a plurality of the smart taps, the analytics engine for each smart tap further configured to analyze the parameter data to identify trends in the parameter data, and the recommendations engine for each smart tap further configured to:
generate a recommendation or report based on the analytics engine analyzing the trends in the parameter data; and
cause output of a user interface to a designated user of the recommendation or report based on the trends in the parameter data.

7. The networked draft beer system of claim 6, wherein the analytics engine is further configured to:
analyze aggregate subsets of the parameter data; and
identify sales performance of various beers and breweries.

8. The networked draft beer system of claim 7, wherein the recommendations engine is configured to:
generate a report indicating the sales performance of at least one beer of the beers brewed by a brewery compared to other beers, sales of the at least one beer in other regions, or sales of the at least one beer at different bars; and
cause the output of the user interface to the designated user associated with one of the various breweries, the user interface including the report.

9. The networked draft beer system of claim 6, wherein the recommendations engine is further configured to:
generate the recommendation, the recommendation including a beer trending in a particular demographic; and
cause output of a user interface to a designated user associated with a bar, the user interface including the recommendation and a user-selectable element configured to enable the designated user to place an order for the beer.

10. The networked draft beer system of claim 9, wherein the at least one sensor comprises a flow meter, wherein the parameter data comprises volume of beer flowing through the plurality of smart taps, and wherein the analytics engine is configured to identify that the beer has been poured above a threshold volume or at volumes exceeding a predetermined rate of change over a window of time.

11. The networked draft beer system of claim 4, wherein:
the data repository is further configured to store pouring instructions associated with a beer; and
the module is further configured to connect the server to the network and transmit the pouring instructions to the smart tap; and
wherein the controller is further configured to:
receive the pouring instructions over the network; and
during the pouring of the beer, control the actuator to open or close the variable opening valve to the determined extent based on the received pouring instructions.

12. The networked draft beer system of claim 11, wherein the display is further configured to display a beer selection user interface and user interface controls enabling a user to input information indicating that the smart tap is fluidically connected to a keg containing the beer, and wherein the controller is configured to send the information to the server with a request for the pouring instructions.

13. The networked draft beer system of claim 12, wherein the controller is further configured to:
cause the display to present, in the beer selection user interface, a list of the plurality of beers; and
in response to receiving user input selecting the beer from the list, configure the smart tap to pour the beer according to the stored pouring instructions associated with the beer.

14. The networked draft beer system of claim 11, further comprising:
a mobile device configured with an application that allows a user to identify the beer that is fluidically connected to the smart tap and to send information regarding the beer to the server;
wherein the server is configured to:
identify that the beer is not represented in the data repository;
identify the pouring instructions based on pouring instructions for another beer analogous to the beer or based on default pouring instructions for a style of the beer; and
update the data repository to include the beer.

15. The networked draft beer system of claim 11, wherein the server is configured to:
store data representing an inventory of a plurality of beers served at a venue of the smart tap; and
send pouring instructions to the smart tap for pouring each of the plurality of beers.

16. The networked draft beer system of claim 11, the pouring instructions comprising a specified volume of foam for a beer flowing through the tap; and determine a timing and duration for activation of the creamer based on the specified volume of foam for the beer.

17. The networked draft beer system of claim 4, wherein the server is configured to:
determine a remaining inventory of the beer based on the parameter data;

compare the remaining inventory to automated ordering settings of a venue of the smart tap; and in response to determining that the remaining inventory is less than an amount specified in the automated ordering settings, automatically place an order for at least one additional keg of the beer with a brewery of the beer or a distributor of the beer.

18. The networked draft beer system of claim 4, wherein the server is configured to:

determine a remaining inventory of the beer based on the parameter data;

compare the remaining inventory to ordering settings of a venue of the smart tap; and in response to determining that the remaining inventory is less than an amount specified in the ordering settings, provide an alert to a user regarding the remaining inventory.

19. The networked draft beer system of claim 18, further comprising a mobile device configured to receive the alert and, in response, display a user interface including a user-selectable element that enables the user to place an order for at least one additional keg of the beer with a brewery of the beer or a distributor of the beer.

20. The networked draft beer system of claim 19, wherein the mobile device is further configured to display a purchasing order user interface responsive to the user placing the order, wherein the purchasing order user interface comprises an additional user-selectable element that enables the user to approve the purchase order.

21. The networked draft beer system of claim 20, wherein the mobile device is further configured to send the approved purchase order to the server for forwarding to the brewery or distributor or to send the approve purchase order to the brewery or distributor.

22. The fluid dispensing tap of claim 1, wherein the variable opening valve comprises a pinch valve, and wherein the creamer comprises an ultrasonic transducer.

23. A fluid dispensing tap comprising:

a housing having a fluid path extending therethrough from an input aperture to an output aperture in a spout of the tap;

a display positioned on a user-facing surface of the housing;

at least one sensor positioned along the fluid path and configured to generate parameter data representing a parameter of fluid flowing along the fluid path based on real-time sensing of the parameter;

a variable opening valve positioned along the fluid path and configured to define a variable area across the fluid path;

an actuator configured to open and close the variable opening valve;

a creamer positioned along the fluid path and configured to agitate the fluid and to cause the fluid to transform from a liquid into a foam;

a rotatable dial positioned around the display on an exterior of the housing, wherein the rotatable dial is configured to be moved along an axis of its rotation; and a controller, wherein the controller is configured to:

receive the parameter data from the at least one sensor;

based at least partly on the parameter data, determine an extent to which to open or close the variable opening valve;

control the actuator to open or close the variable opening valve to the determined extent;

in response to receiving a creamer activation signal, activate the creamer to agitate the fluid;

generate an output for presentation on the display based at least partly on the parameter data;

receive a signal representing a positioning of the rotatable dial relative to the housing;

identify a pour volume indicated by the positioning of the rotatable dial;

update the display based at least partly on the pour volume indicated by the positioning of the rotatable dial;

identify selected user interface options based on user rotation of the rotatable dial;

and wherein the controller is further configured to at least one of:

control the actuator and creamer based at least partly on a specified volume of liquid and a specified volume of foam for the pour volume; and determine a timing and duration for activation of the creamer based on the pour volume.

24. The fluid dispensing tap of claim 23, wherein the variable opening valve comprises a pinch valve, and wherein the creamer comprises an ultrasonic transducer.

25. The fluid dispensing tap of claim 23, wherein the fluid comprises beer, and wherein the controller is configured to at least one of:

output alerts or status indicators on the display based on the parameter data; and determine the extent to which to open or close the variable opening based at least partly on a type of the beer.

26. The fluid dispensing tap of claim 23, wherein the at least one sensor comprises at least one of:

a pressure sensor, temperature sensor, and flow meter; and a color sensor configured to detect a color of the fluid.

27. The fluid dispensing tap of claim 23, further comprising:

a handle coupled to an exterior of the housing; and a position sensor configured to generate position data representing whether the handle is in any of a first or second position;

wherein the controller is configured to:

in response to receiving position data indicating that the handle is in the first position, close the variable opening valve to stop flow of the fluid along the fluid path; and in response to receiving position data indicating that the handle is in the second position, control the actuator to open or close the variable opening valve to the determined extent.

\* \* \* \* \*

UNITED STATES PATENT AND TRADEMARK OFFICE
CERTIFICATE OF CORRECTION

PATENT NO. : 11,820,641 B2
APPLICATION NO. : 16/621428
DATED : November 21, 2023
INVENTOR(S) : Ahmet Necdet Alpmen It is certified that error appears in the above-identified patent and that said Letters Patent is hereby corrected as shown below:

In the Claims

At Column 32, Line 39, in Claim 14 delete "claim 11," and insert -- claim 13, --.

Signed and Sealed this
Thirteenth Day of February, 2024

Katherine Kelly Vidal
*Director of the United States Patent and Trademark Office*